US011552441B2

(12) United States Patent
Ashibe et al.

(10) Patent No.: US 11,552,441 B2
(45) Date of Patent: Jan. 10, 2023

(54) DISPLAY DEVICE AND DISPLAY METHOD

(71) Applicant: CANON KABUSHIKI KAISHA, Tokyo (JP)

(72) Inventors: Tsunenori Ashibe, Yokohama (JP); Hidehiko Fujimura, Hachioji (JP); Katsuhiro Watanabe, Wako (JP); Hiroyuki Morimoto, Utsunomiya (JP); Shunsuke Kuboyama, Kawasaki (JP); Toshiji Nishiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 537 days.

(21) Appl. No.: 16/685,023

(22) Filed: Nov. 15, 2019

(65) Prior Publication Data

US 2020/0184861 A1    Jun. 11, 2020

(30) Foreign Application Priority Data

Dec. 6, 2018 (JP) .............................. JP2018-229461
Feb. 12, 2019 (JP) .............................. JP2019-023058
Oct. 29, 2019 (JP) .............................. JP2019-196784

(51) Int. Cl.
*H01S 3/10* (2006.01)
*H01S 3/09* (2006.01)
(Continued)

(52) U.S. Cl.
CPC ............... *H01S 3/10* (2013.01); *H01S 3/005* (2013.01); *H01S 3/0071* (2013.01);
(Continued)

(58) Field of Classification Search
CPC .......... H01S 3/10; H01S 3/005; H01S 3/0071; H01S 3/0078; H01S 3/0085; H01S 3/09
See application file for complete search history.

(56) References Cited

U.S. PATENT DOCUMENTS 5,613,103 A    3/1997 Nobutani et al.
5,736,981 A    4/1998 Nobutani et al.
(Continued)

FOREIGN PATENT DOCUMENTS

CN    101989048 A    3/2011
CN    102854620 A    1/2013
(Continued)

OTHER PUBLICATIONS

Nov. 17, 2021 Chinese Official Action in Chinese Patent Appln. No. 201911217074.X.
(Continued)

*Primary Examiner* — Kinam Park
(74) *Attorney, Agent, or Firm* — Venable LLP

(57) ABSTRACT

A display device includes a laser irradiation device and a control device. The laser irradiation device is configured to irradiate an irradiation point located at a display position in air, with a laser beam having a wavelength equal to or larger than 380 nm and equal to or smaller than 780 nm and produce plasma at the display position. The control device is configured to control intensity of the laser beam emitted from the at least one laser irradiation device so that a relationship between intensity of plasma light emitted from the plasma at the display position and intensity of scattered light produced from the laser beam and scattered by the plasma becomes a predetermined relationship to display a color pixel.

20 Claims, 23 Drawing Sheets

(51) Int. Cl.
*H01S 3/00* (2006.01)
*G09F 19/18* (2006.01)
*H01S 3/30* (2006.01)

(52) U.S. Cl.
CPC .......... *H01S 3/0078* (2013.01); *H01S 3/0085* (2013.01); *H01S 3/09* (2013.01); *G09F 19/18* (2013.01); *H01S 3/302* (2013.01)

(56) References Cited

U.S. PATENT DOCUMENTS

| | | | |
|---|---|---|---|
| 5,838,291 A | 11/1998 | Ohshima et al. | |
| 5,926,159 A | 7/1999 | Matsuzaki et al. | |
| 6,140,996 A | 10/2000 | Nobutani et al. | |
| 6,157,359 A | 12/2000 | Shimakura et al. | |
| 6,303,903 B1 * | 10/2001 | Liu | B23K 26/04 219/121.75 |
| 6,355,908 B1 * | 3/2002 | Tatah | B23K 26/04 219/121.81 |
| 6,860,779 B2 | 3/2005 | Fujimura et al. | |
| 7,533,995 B2 | 5/2009 | Momiuchi et al. | |
| 7,766,485 B2 | 8/2010 | Momiuchi et al. | |
| 8,369,374 B2 | 2/2013 | Yokota | |
| 10,469,837 B2 | 11/2019 | Khan | |
| 2005/0068999 A1 | 3/2005 | Momiuchi et al. | |
| 2009/0213340 A1 * | 8/2009 | Momiuchi | G02B 30/56 353/62 |
| 2011/0026547 A1 | 2/2011 | Yokota | |
| 2016/0259298 A1 * | 9/2016 | Farringdon | G02B 30/56 |
| 2017/0293259 A1 * | 10/2017 | Ochiai | G02B 3/0006 |
| 2018/0220127 A1 | 8/2018 | Khan | |
| 2020/0274314 A1 * | 8/2020 | Bezel | H01S 3/13013 |

FOREIGN PATENT DOCUMENTS

| | | |
|---|---|---|
| CN | 107850790 A | 3/2018 |
| JP | 2003-233339 A | 8/2003 |
| JP | 2007-206588 A | 8/2007 |
| JP | 2009-186654 A | 8/2009 |

OTHER PUBLICATIONS

Z. Zhang, et al., "Spectral and temporal characteristics of air-plasma continuum generated by nanosecond laser at 355 nm," Optics & Laser Technology, vol. 56, Mar. 2014, pp. 358-361.

May 11, 2020 European Search Report in European Patent Appln. No. 19210554.2.

* cited by examiner

FIG.13

| LASER POWER (mW) | VISUALLY IDENTIFIED COLOR |
|---:|---|
| 1000 | NO EMISSION IDENTIFIED |
| 1100 | SLIGHT WEAK GREEN |
| 1200 | WEAK GREEN |
| 1500 | CLEAR GREEN |
| 2500 | BRIGHT GREEN |
| 3000 | GLARING GREEN |
| 4000 | THIN GREEN |
| 6000 | BLUISH WHITE |
| 12000 | BLUISH WHITE WITH IMPACT SOUND |

| LASER POWER (mW) | VISUALLY IDENTIFIED COLOR | RATIO OF Y VALUE OF PLASMA LIGHT TO Y VALUE OF SCATTERED LIGHT AT OR NEAR WAVELENGTH OF LASER BEAM | x | y |
|---|---|---|---|---|
| 1000 | NO EMISSION IDENTIFIED | NO VALUE | | |
| 1100 | SLIGHT WEAK GREEN | 5% | 0.1685 | 0.7985 |
| 1200 | WEAK GREEN | 15% | 0.1785 | 0.7785 |
| 1500 | CLEAR GREEN | 24% | 0.1993 | 0.7044 |
| 2500 | BRIGHT GREEN | 35% | 0.2022 | 0.6547 |
| 3000 | GLARING GREEN | 60% | 0.2089 | 0.4923 |
| 4000 | THIN GREEN | 95% | 0.2153 | 0.4287 |
| 6000 | BLUISH WHITE | 120% | 0.2944 | 0.3852 |
| 12000 | BLUISH WHITE WITH IMPACT SOUND | 200% | 0.2654 | 0.3122 |

FIG.15

| | MEASUREMENT ANGLE (°) | 20 | 30 | 45 | 90 | 135 | 225 | 270 | 315 | 330 | 340 |
|---|---|---|---|---|---|---|---|---|---|---|---|
| ONLY PLASMA LIGHT | X | 28904 | 28854 | 28827 | 28896 | 28844 | 28898 | 28893 | 28838 | 28894 | 28911 |
| | Y(Y1) | 57238 | 38428 | 36422 | 36328 | 36321 | 36346 | 36311 | 36451 | 38472 | 57231 |
| | Z | 57042 | 37813 | 34813 | 34718 | 34756 | 34781 | 34757 | 34839 | 37879 | 57014 |
| SCATTERED LIGHT OF VISIBLE LASER BEAM | X | 29557 | 30023 | 30066 | 30133 | 30091 | 30101 | 30138 | 30078 | 30055 | 29533 |
| | Y(Y2) | 151609 | 153611 | 153613 | 153604 | 153551 | 153632 | 153674 | 153617 | 153669 | 151611 |
| | Z | 7307 | 7396 | 7401 | 7462 | 7444 | 7488 | 7479 | 7428 | 7388 | 7321 |
| (Y1/Y2)*100(%) | | 37.8 | 25.0 | 23.7 | 23.7 | 23.7 | 23.7 | 23.6 | 23.7 | 25.0 | 37.7 |
| LIGHT EMITTER | X | 58461 | 58877 | 58893 | 59029 | 58935 | 58999 | 59031 | 58916 | 58949 | 58444 |
| | Y | 208847 | 192039 | 190035 | 189932 | 189872 | 189978 | 189985 | 190068 | 192141 | 208842 |
| | Z | 64350 | 45209 | 42214 | 42180 | 42200 | 42269 | 42236 | 42267 | 45267 | 64335 |
| | x | 0.1763 | 0.1988 | 0.2023 | 0.2028 | 0.2025 | 0.2026 | 0.2027 | 0.2023 | 0.1989 | 0.1762 |
| | y | 0.6297 | 0.6485 | 0.6527 | 0.6524 | 0.6525 | 0.6523 | 0.6523 | 0.6526 | 0.6483 | 0.6298 |
| COLOR | | SLIGHTLY-BLUISH GREEN | GREEN | GREEN | GREEN | GREEN | GREEN | GREEN | GREEN | GREEN | SLIGHTLY-BLUISH GREEN |

FIG.16

| | MEASUREMENT ANGLE (°) | 20 | 30 | 45 | 90 | 135 | 225 | 270 | 315 | 330 | 340 |
|---|---|---|---|---|---|---|---|---|---|---|---|
| ONLY PLASMA LIGHT | X | 31239 | 23344 | 20334 | 20346 | 20312 | 20340 | 20390 | 20347 | 23416 | 31274 |
| | Y(Y1) | 207526 | 25395 | 23995 | 23685 | 23548 | 23541 | 23654 | 24043 | 25005 | 207544 |
| | Z | 185105 | 29413 | 19413 | 19444 | 19424 | 19437 | 19478 | 19313 | 29513 | 185119 |
| SCATTERED LIGHT OF VISIBLE LASER BEAM | X | 299344 | 299248 | 299203 | 294203 | 294144 | 294184 | 294196 | 299241 | 299287 | 299315 |
| | Y(Y2) | 27130 | 27104 | 27094 | 27045 | 26902 | 26915 | 27024 | 27089 | 27115 | 27130 |
| | Z | 1541257 | 1540416 | 1540416 | 1540405 | 1540289 | 1540260 | 1540426 | 1540436 | 1540412 | 1541222 |
| (Y1/Y2) *100(%) | | 764.9 | 93.7 | 88.6 | 87.6 | 87.5 | 87.5 | 87.5 | 88.8 | 92.2 | 765.0 |
| LIGHT EMITTER | X | 330583 | 322592 | 319537 | 314549 | 314456 | 314524 | 314586 | 319588 | 322703 | 330589 |
| | Y | 234656 | 52499 | 51089 | 50730 | 50450 | 50456 | 50678 | 51132 | 52120 | 234674 |
| | Z | 1726362 | 1569829 | 1559829 | 1559849 | 1559713 | 1559697 | 1559904 | 1559749 | 1569925 | 1726341 |
| | x | 0.1443 | 0.1659 | 0.1655 | 0.1634 | 0.1634 | 0.1634 | 0.1634 | 0.1655 | 0.1659 | 0.1443 |
| | y | 0.1024 | 0.0270 | 0.0265 | 0.0264 | 0.0262 | 0.0262 | 0.0263 | 0.0265 | 0.0268 | 0.1024 |
| | COLOR | BLUE-GREEN | BLUE | BLUE | BLUE | BLUE | BLUE | BLUE | BLUE | BLUE | BLUE-GREEN |

FIG.17

| | MEASUREMENT ANGLE (°) | 20 | 30 | 45 | 90 | 135 | 225 | 270 | 315 | 330 | 340 |
|---|---|---|---|---|---|---|---|---|---|---|---|
| ONLY PLASMA LIGHT | X | 30542 | 23323 | 20320 | 20300 | 20216 | 20182 | 20306 | 20343 | 23350 | 30532 |
| | Y(Y1) | 45490 | 28984 | 23939 | 23813 | 23225 | 23114 | 23741 | 23845 | 28984 | 45459 |
| | Z | 48821 | 29417 | 19459 | 19390 | 19190 | 19167 | 19378 | 19467 | 29427 | 48849 |
| SCATTERED LIGHT OF VISIBLE LASER BEAM | X | 115819 | 115608 | 115508 | 115476 | 115179 | 115150 | 115468 | 115516 | 115642 | 115835 |
| | Y(Y2) | 75819 | 63153 | 61153 | 61100 | 61112 | 61129 | 61124 | 61274 | 63274 | 75825 |
| | Z | 28405 | 16188 | 16106 | 16998 | 16911 | 16957 | 16971 | 16141 | 16166 | 28489 |
| (Y1/Y2)*100(%) | | 60.0 | 45.9 | 39.1 | 39.0 | 38.0 | 37.8 | 38.8 | 38.9 | 45.8 | 60.0 |
| LIGHT EMITTER | X | 146361 | 138931 | 135828 | 135776 | 135395 | 135332 | 135774 | 135859 | 138992 | 146367 |
| | Y | 121309 | 92137 | 85092 | 84913 | 84337 | 84243 | 84865 | 85119 | 92258 | 121284 |
| | Z | 77226 | 45605 | 35565 | 36388 | 36101 | 36124 | 36349 | 35608 | 45593 | 77338 |
| | x | 0.4244 | 0.5021 | 0.5296 | 0.5282 | 0.5292 | 0.5293 | 0.5283 | 0.5295 | 0.5021 | 0.4243 |
| | y | 0.3517 | 0.3330 | 0.3318 | 0.3303 | 0.3297 | 0.3295 | 0.3302 | 0.3317 | 0.3333 | 0.3516 |
| | COLOR | ORANGE | RED | RED | RED | RED | RED | RED | RED | RED | ORANGE |

FIG.18

| | MEASUREMENT ANGLE (°) | 20 | 30 | 45 | 90 | 135 | 225 | 270 | 315 | 330 | 340 |
|---|---|---|---|---|---|---|---|---|---|---|---|
| ONLY PLASMA LIGHT | X | 20566 | 233540 | 233553 | 233518 | 233583 | 233567 | 233519 | 233563 | 233461 | 20566 |
| | Y(Y1) | 52567 | 156604.5 | 153482.7 | 158178.5 | 155174 | 153770.9 | 155802.1 | 159816.9 | 155173 | 52571 |
| | Z | 32032 | 253352.9 | 253366 | 253334 | 253347 | 253323 | 253361 | 253279 | 253267 | 32058 |
| SCATTERED LIGHT OF VISIBLE LASER BEAM | X | 373495 | 30143 | 30172 | 30171 | 30179 | 30161 | 30189 | 30093 | 30101 | 373519 |
| | Y(Y2) | 1841662 | 155054 | 155033 | 155077 | 155019 | 155011 | 155027 | 155162 | 155018 | 1841684 |
| | Z | 104018 | 7662 | 7696 | 7633 | 7664 | 7699 | 7618 | 7577 | 7683 | 104058 |
| (Y1/Y2)*100(%) | | 2.9 | 101.0 | 99.0 | 102.0 | 100.1 | 99.2 | 100.5 | 103.0 | 100.1 | 2.9 |
| LIGHT EMITTER | X | 394061 | 263683 | 263725 | 263689 | 263762 | 263728 | 263708 | 263656 | 263562 | 394085 |
| | Y | 1894229 | 311658 | 308516 | 313256 | 310193 | 308782 | 310829 | 314979 | 310191 | 1894255 |
| | Z | 136049 | 261015 | 261062 | 260967 | 261011 | 261022 | 260979 | 260856 | 260950 | 136116 |
| | x | 0.1625 | 0.3153 | 0.3165 | 0.3147 | 0.3159 | 0.3164 | 0.3156 | 0.3141 | 0.3158 | 0.1625 |
| | y | 0.7813 | 0.3726 | 0.3702 | 0.3739 | 0.3715 | 0.3705 | 0.3720 | 0.3752 | 0.3716 | 0.7813 |
| | COLOR | BLUISH GREEN | COLORLESS | COLORLESS | COLORLESS | COLORLESS | COLORLESS | COLORLESS | COLORLESS | COLORLESS | BLUISH GREEN |

FIG.19

| | MEASUREMENT ANGLE (°) | 20 | 30 | 45 | 90 | 135 | 225 | 270 | 315 | 330 | 340 |
|---|---|---|---|---|---|---|---|---|---|---|---|
| ONLY PLASMA LIGHT | X | 20566 | 163513 | 163518 | 163553 | 163436 | 163733 | 163500 | 163685 | 163443 | 20596 |
| | Y(Y1) | 252567 | 84630 | 84641 | 86106 | 84512 | 82824 | 86738 | 84261 | 83459 | 252546 |
| | Z | 32032 | 73323 | 73395 | 73366 | 73273 | 73293 | 73360 | 73162 | 73502 | 32088 |
| SCATTERED LIGHT OF VISIBLE LASER BEAM | X | 50174 | 50174 | 50182 | 50172 | 50134 | 50302 | 50127 | 50128 | 50302 | 50136 |
| | Y(Y2) | 70525 | 70525 | 70534 | 70579 | 70603 | 70190 | 70519 | 70511 | 70728 | 70539 |
| | Z | 317723 | 317723 | 317696 | 317696 | 317733 | 317834 | 317749 | 317677 | 317644 | 317755 |
| (Y1/Y2)*100(%) | | 358.1 | 120.0 | 120.0 | 122.0 | 119.7 | 118.0 | 123.0 | 119.5 | 118.0 | 358.0 |
| LIGHT EMITTER | X | 70740 | 213687 | 213700 | 213725 | 213570 | 214035 | 213627 | 213813 | 213745 | 70732 |
| | Y | 323092 | 155155 | 155175 | 156685 | 155115 | 153014 | 157257 | 154772 | 154187 | 323085 |
| | Z | 349755 | 391046 | 391091 | 391062 | 391006 | 391127 | 391109 | 390839 | 391146 | 349843 |
| | x | 0.0951 | 0.2812 | 0.2812 | 0.2807 | 0.2811 | 0.2823 | 0.2804 | 0.2815 | 0.2816 | 0.0951 |
| | y | 0.4345 | 0.2042 | 0.2042 | 0.2058 | 0.2042 | 0.2018 | 0.2064 | 0.2038 | 0.2031 | 0.4345 |
| | COLOR | BLUE-GREEN | COLORLESS | COLORLESS | COLORLESS | COLORLESS | COLORLESS | COLORLESS | COLORLESS | COLORLESS | BLUE-GREEN |

FIG.20

| | MEASUREMENT ANGLE (°) | 20 | 30 | 45 | 90 | 135 | 225 | 270 | 315 | 330 | 340 |
|---|---|---|---|---|---|---|---|---|---|---|---|
| ONLY PLASMA LIGHT | X | 20661 | 123506 | 123518 | 123478 | 123509 | 123524 | 123566 | 123335 | 123448 | 20661 |
| | Y(Y1) | 252563 | 99571 | 104114 | 109517 | 100467 | 116802 | 100554 | 109517 | 105911 | 252563 |
| | Z | 32131 | 173321 | 173395 | 173299 | 173504 | 173394 | 173331 | 173188 | 173373 | 32131 |
| SCATTERED LIGHT OF VISIBLE LASER BEAM | X | 150120 | 150171 | 150182 | 150172 | 150232 | 150177 | 150172 | 150099 | 150109 | 150120 |
| | Y(Y2) | 90539 | 90519 | 90534 | 90510 | 90511 | 90544 | 90589 | 90510 | 90522 | 90539 |
| | Z | 15624 | 15674 | 15696 | 15633 | 15692 | 15737 | 15568 | 15691 | 15664 | 15624 |
| (Y1/Y2)*100(%) | | 279.0 | 110.0 | 115.0 | 121.0 | 111.0 | 129.0 | 111.0 | 121.0 | 117.0 | 279.0 |
| LIGHT EMITTER | X | 170781 | 273677 | 273700 | 273650 | 273741 | 273701 | 273738 | 273434 | 273557 | 170781 |
| | Y | 343102 | 190090 | 194648 | 200027 | 190978 | 207346 | 191143 | 200027 | 196433 | 343102 |
| | Z | 47755 | 188995 | 189091 | 188932 | 189196 | 189131 | 188899 | 188879 | 189037 | 47755 |
| | x | 0.3041 | 0.4193 | 0.4163 | 0.4130 | 0.4186 | 0.4084 | 0.4187 | 0.4128 | 0.4151 | 0.3041 |
| | y | 0.6109 | 0.2912 | 0.2961 | 0.3019 | 0.2921 | 0.3094 | 0.2924 | 0.3020 | 0.2981 | 0.6109 |
| | COLOR | YELLOW-GREEN | COLORLESS | COLORLESS | COLORLESS | COLORLESS | COLORLESS | COLORLESS | COLORLESS | COLORLESS | YELLOW-GREEN |

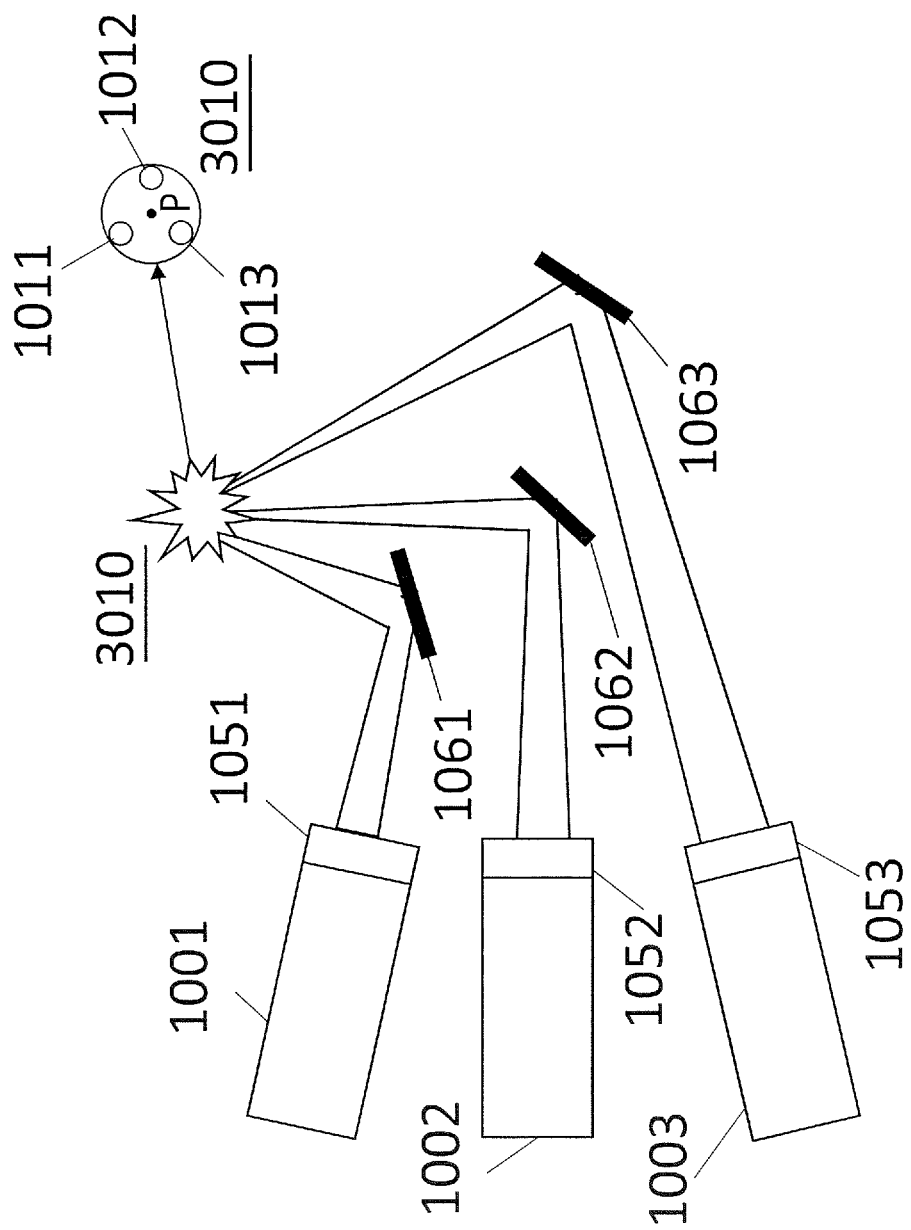

DISPLAY DEVICE AND DISPLAY METHOD

BACKGROUND OF THE INVENTION

Field of the Invention

The present invention relates to a display device and a display method that irradiate an irradiation point in the air, with a laser beam having a wavelength equal to or larger than 380 nm and equal to or smaller than 780 nm, and form a display pixel having a desired display color at the irradiation point.

Description of the Related Art

Conventionally, techniques to form an image in the air by focusing a laser beam have been proposed. For example, Japanese Patent Application Publication No. 2003-233339 discloses a technique that displays an image in the air by locally producing a flash (plasma light). The flash is produced when an invisible laser beam causes a dielectric breakdown in a gas of the air and locally produces high-density plasma. This technique causes a scanning means to scan an area of the air with the laser beam, while controlling the position at which the plasma light is produced, for forming an image in the air. Here, Japanese Patent Application Publication No. 2003-233339 also discloses the fact that an impact sound is produced together with the plasma.

In the case where the plasma light is directly used for displaying an image as described above, since the plasma light is white, displayed images will be monochrome. In addition, Japanese Patent Application Publication No. 2003-233339 discloses another technique. In this technique, when an invisible laser beam is focused on a desired display position in the air, fluctuation occurs in the display position. Thus, when the display position in the fluctuation is irradiated with a colored laser beam, the display position can be used as a display pixel of a color image.

As another proposal, Japanese Patent Application Publication No. 2009-186654 discloses a color-image forming device that produces plasma light in liquid and allows observes to visually identify a colored light emitter. In this case, the observers visually identify the colored light emitter on a side opposite to the laser beam with respect to the colored light emitter.

If images are displayed in the air by using such a laser beam, 3-D images can be displayed in the air, allowing observers to observe the 3-D images, in various observation directions. Thus, it is desired to achieve a practical image forming device and method. However, although the present inventors conducted an experiment for reproducing a three-dimensional image by using the method of Japanese Patent Application Publication No. 2003-233339, any colored light emitter was not produced. In particular, although the present inventors produced the fluctuation at a display position in the air, by using an invisible laser beam, and irradiated the irradiation point with a colored laser beam, any colored light emitter was not produced.

Thus, in such an air-heated state in which the fluctuation merely occurs, it is difficult to scatter the laser beam for displaying images. In addition, in Japanese Patent Application Publication No. 2003-233339, since the plasma light emitter that involves the flash and the impact sound has extremely high energy and brightness, it is difficult to produce a color by using the plasma light emitter. Furthermore, since the impact sound is produced when the plasma (having brightness as high as can be visually identified) flashes, it is difficult to use the technique for display devices, such as liquid crystal displays, that can be easily used indoors. In the technique disclosed in Japanese Patent Application Publication No. 2009-186654, since images are displayed in liquid, that is, in a container that contains the liquid, the technique cannot be used for freely displaying color images in the air, at positions above observers.

SUMMARY OF THE INVENTION

According to a first aspect of the present invention, a display device includes at least one laser irradiation device configured to irradiate an irradiation point located at a display position in air, with a laser beam having a wavelength equal to or larger than 380 nm and equal to or smaller than 780 nm and produce plasma at the display position, and a control device configured to control intensity of the laser beam emitted from the at least one laser irradiation device so that a relationship between intensity of plasma light emitted from the plasma at the display position and intensity of scattered light produced from the laser beam and scattered by the plasma becomes a predetermined relationship to display a color pixel.

According to a second aspect of the present invention, a display method includes a display step in which at least one laser irradiation device irradiates an irradiation point located at a display position in air, with a laser beam having a wavelength equal to or larger than 380 nm and equal to or smaller than 780 nm and produces plasma at the display position. The display step includes a control step in which intensity of the laser beam emitted from the at least one laser irradiation device is controlled so that a relationship between intensity of plasma light emitted from the plasma at the display position and intensity of scattered light produced from the laser beam and scattered by the plasma becomes a predetermined relationship to display a color pixel.

Further features of the present invention will become apparent from the following description of exemplary embodiments with reference to the attached drawings.

BRIEF DESCRIPTION OF THE DRAWINGS

FIG. 13 is a table in which an observed color of a light emitter, produced in the air by a laser beam having a wavelength of 532 nm and emitted from the display device of the embodiment of the present invention, is described for each laser power.

FIG. 14 is a table in which an observed color of a light emitter, produced in the air by a laser beam having a wavelength of 532 nm and emitted from the display device of the embodiment of the present invention, and a ratio of a Y value of the plasma light to a Y value of the light at or near the wavelength of the laser beam are described for each laser power.

FIG. 15 is a table in which an observed color of a light emitter, produced in the air by a green laser beam emitted from the display device of the embodiment of the present invention, and a ratio of a Y value of the plasma light to a Y value of the light at or near the wavelength of the green laser beam are specifically described for each measurement angle.

FIG. 16 is a table in which an observed color of a light emitter, produced in the air by a blue laser beam emitted from the display device of the embodiment of the present invention, and a ratio of a Y value of the plasma light to a Y value of the light at or near the wavelength of the blue laser beam are specifically described for each measurement angle.

FIG. 17 is a table in which an observed color of a light emitter, produced in the air by a red laser beam emitted from the display device of the embodiment of the present invention, and a ratio of a Y value of the plasma light to a Y value of the light at or near the wavelength of the red laser beam are specifically described for each measurement angle.

FIG. 18 is a table in which an observed color of a light emitter, produced in the air by a green laser beam emitted from the display device of the comparative example 1 so that the ratio of the Y value of the plasma light to the Y value of the light at or near the wavelength of the green laser beam is equal to or smaller than 5% or larger than 100%, is described for each measurement angle.

FIG. 19 is a table in which an observed color of a light emitter, produced in the air by a blue laser beam emitted from the display device of the comparative example 2 so that the ratio of the Y value of the plasma light to the Y value of the light at or near the wavelength of the blue laser beam is equal to or smaller than 5% or larger than 100%, is described for each measurement angle.

FIG. 20 is a table in which an observed color of a light emitter, produced in the air by a red laser beam emitted from the display device of the comparative example 3 so that the ratio of the Y value of the plasma light to the Y value of the light at or near the wavelength of the red laser beam is equal to or smaller than 5% or larger than 100%, is described for each measurement angle.

FIG. 23 is a diagram illustrating an example of a configuration for displaying moving or three-dimensional images by using the color-image display device of the embodiment of the present invention.

DESCRIPTION OF THE EMBODIMENTS

Figure 1:
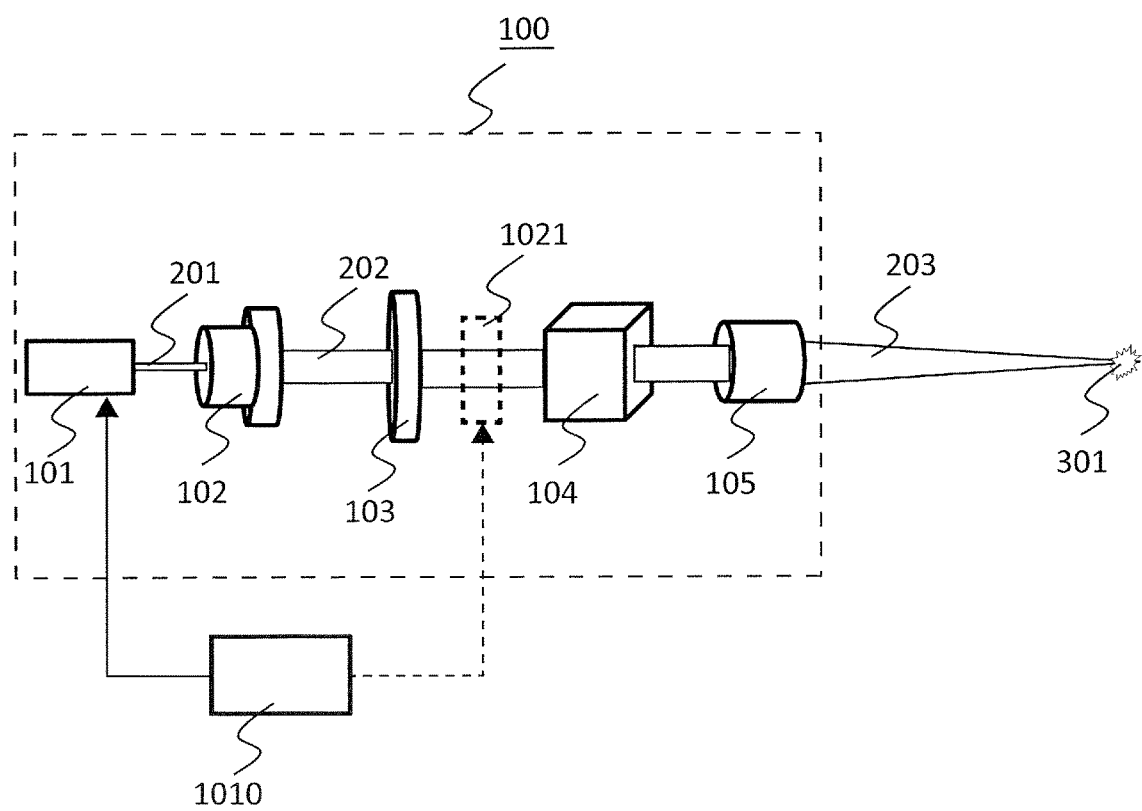
FIG. 1 is a diagram illustrating a schematic configuration of a display device of an embodiment of the present invention.

Hereinafter, some embodiments of the present invention will be described with reference to the accompanying drawings. Here, since the following configurations are merely examples, detailed parts of the configurations may be appropriately modified by a person skilled in the art without departing the spirit of the present invention. In addition, numerical values of the embodiments are examples.

In the following first and second embodiments, a configuration to form a primary-color pixel in the air by using a visible laser beam will be described. The primary-color pixel, required for displaying a color image in the air, has a color equal to the emission color of the laser beam. In a third embodiment, a color-image display device will be described. The color-image display device includes laser irradiation devices, each of which is described in the first and the second embodiments and emits a visible laser beam with a corresponding one of the three primary colors R, G, and B. The color-image display device of the third embodiment irradiates irradiation points located in the vicinity of a display position of a pixel, with laser beams; and forms a color pixel having any emission color, at the display position by using the additive color mixing.

First Embodiment

Laser Irradiation Device

The display device (image forming device) of the present embodiment uses a laser beam in a predetermined wavelength range, especially, in a wavelength range of visible light; and allows observers to visually identify an emission color of the laser beam. Here, the predetermined wavelength range or the wavelength range of visible light may vary depending on the definition and the individual difference in observers. Thus, in the present embodiment, the wavelength range of visible light is defined as a range equal to or larger than 380 nm and equal to or smaller than 780 nm. However, even when a later-described value varies in a range from zero to tens of nanometers in the predetermined wavelength range (wavelength range of visible light), substantially the same effect will be produced by achieving the same configuration or control as that of a later-described example. The present embodiment differs from the conventional techniques, which uses an invisible laser beam to produce plasma for displaying images, or which uses an invisible laser beam to produce the fluctuation in the air without producing plasma and uses a visible laser beam for coloring an irradiation point located in the fluctuation.

In the present embodiment, the color produced in the air, that is, in a gas of the atmosphere (air) is a color of the visible laser beam. In principle, light emitters of red, green, and blue, produced by laser beams, are formed at positions in the air. The positions are the same as each other, or are close to each other. Thus, each pixel serves as a full-color display pixel, and multiple pixels formed in this manner can display a three-dimensional image. In the present embodiment, as a basis of achieving the full-color display pixel, a configuration and control to form a display pixel by using a single-color laser beam will be described.

The laser used for displaying images is preferably a high-power laser, that is, a short-pulse laser. A known short-pulse laser is a solid laser, a fiber laser, a semiconductor laser, or a gas laser. Among these lasers, lasers such as the solid laser and the fiber laser are preferable because of their good laser stability.

Mechanism of Displaying Color Images

Here, a mechanism of the present embodiment for displaying three-dimensional color images will be described. FIGS. 1 to 4 illustrate a schematic configuration of a display device (image forming device) of the present embodiment. In FIG. 1, a laser light source 101 is a light source of visible laser beam as described later. The light source of visible laser beam emits a laser beam 201 to produce a display pixel at a display position 301. When the display pixel is produced, observers will visually identify a light emitter as if the light emitter appeared at the display position. As specifically described later, most of the light sent from the display position to observers is scattered light produced when the visible laser beam from the laser light source 101 is scattered by weak plasma, which is produced at the display position by the visible laser beam. Since the display pixel is visually identified by observers as if the light emitter appeared, the space in which the visible laser beam is intensely scattered at the display position may be referred to as a light emitter in the specification. In addition, in the specification, the color other than white and displayed at the display position may be expressed as a colored color. In addition, in the tables and the figures, although white plasma light may be referred to as colorless light for convenience of description, the light is not transparent, but merely has a color other than the above-described colored color.

The laser irradiation device 100 of FIG. 1 includes the laser light source 101, a beam expander 102, a polarizing plate 103, a beam splitter 104, and a condensing lens (condensing device) 105. The laser light source 101 of FIG. 1 generates the laser beam 201 in a wavelength range of visible light. For example, the laser beam 201 has a wavelength of 532 nm. This laser beam 201 is visually identified as a green laser beam. The laser beam 201 is made incident on an optical path illustrated in FIG. 1. The optical path may be constituted by the beam expander 102 that increases the diameter of the laser beam, the polarizing plate 103, the beam splitter (polarized-beam splitter) 104, and the condensing lens 105. The optical path is adjusted so that the laser beam 203 is focused on the display position, which is separated from the condensing lens 105 by a predetermined distance. For example, the display position is separated from the leading end of the condensing lens 105 by 90 mm. The beam expander 102 increases the diameter of the laser beam 201 about tenfold, and outputs a laser beam 202. Here, when the focal distance is changed, the magnification of the beam expander 102 may be changed accordingly.

In FIG. 1, the irradiation intensity of the laser beam from the laser light source 101 is controlled by a control unit 1010. For example, the control unit 1010 controls the driving power for the laser light source 101, and thereby controls the irradiation intensity of the laser beam emitted from the laser light source 101. In addition, as specifically described in the second embodiment, the control unit 1010 changes the combination of the polarizing direction in the polarizing plate 103 and the magnification of the beam expander 102, and thereby controls the irradiation intensity of the laser beam emitted from the laser light source 101. In FIG. 1, the laser irradiation device 100 may include another control means 1021 for controlling the laser irradiation intensity. The control means 1021 may be a component, such as a liquid crystal shutter, that can change light transmittance.

Figure 21:
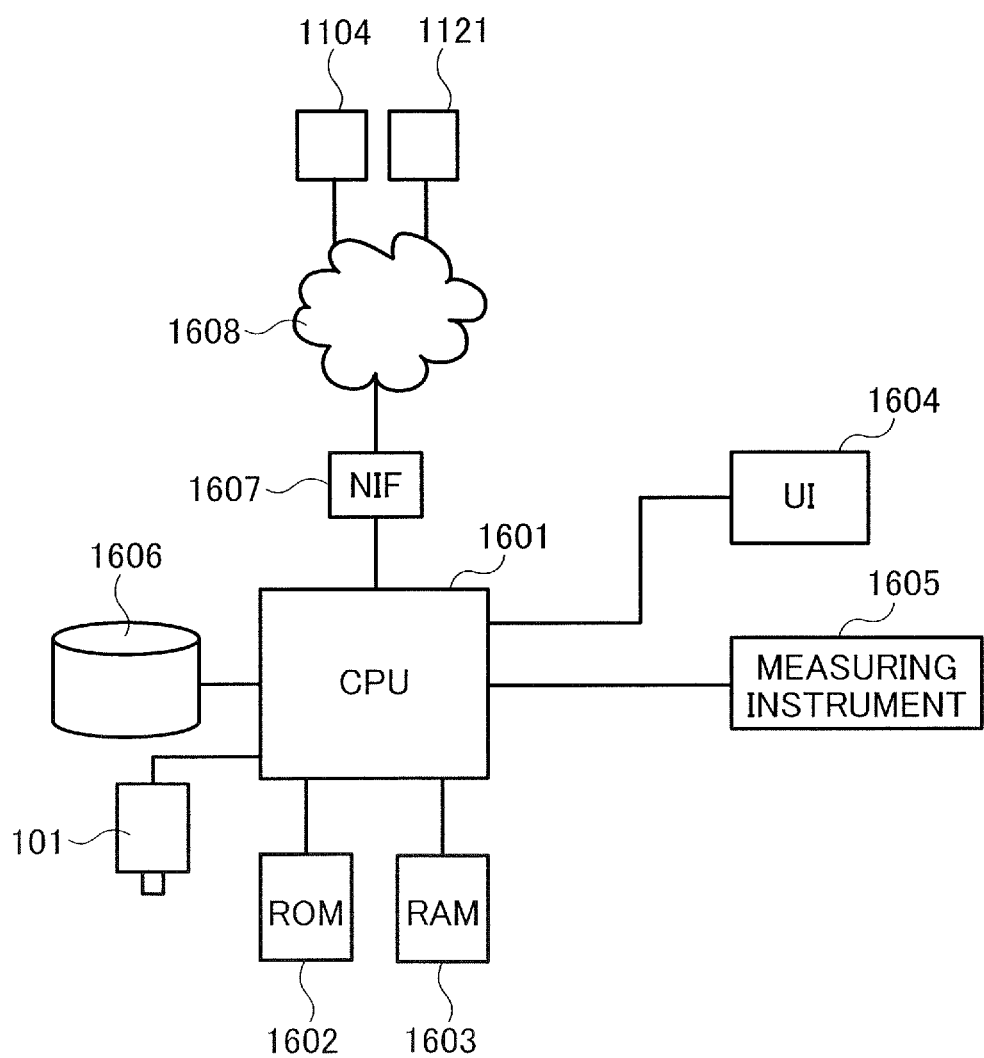
FIG. 21 is a block diagram illustrating an example of a detailed configuration of a control system for the display device of the embodiment of the present invention.

FIG. 21 illustrates one example of a specific configuration of a control system that constitutes the control unit 1010. The control system of FIG. 21 may be a PC hardware, which includes a CPU 1601 serving as a main control means, and a ROM 1602 and a RAM 1603 serving as storage devices. The ROM 1602 stores a control program and data on constants, used to execute control procedures as described later. When the control procedures are executed, the RAM 1603 is used as a work area of the CPU 1601. The control system of FIG. 21 is connected with an external storage device 1606. The external storage device 1606 may be an HDD, an SSD, or an external storage device of another network-mounted system, but may not be used in the embodiment of the present invention.

The control program for the CPU 1601 to perform the laser power control of the present embodiment may be stored in a storage unit, such as the above-described external storage device 1606 or the ROM 1602 (e.g. EEPROM area of the ROM 1602). In this case, the control program for the CPU 1601 to execute the control procedures of the present embodiment may be supplied to the above-described storage unit via a network interface 1607, and may be replaced (updated) with a new (another) program. Alternatively, the control program for the CPU 1601 to achieve the later-described control procedures may be supplied to the above-described storage unit via a storage means such as a magnetic disk, an optical disk, or a flash memory, and via a driving device for the storage means; and may be updated. The storage means, the storage unit, or the storage device that stores the control program for the CPU 1601 to achieve the control procedures of the present embodiment is a computer-readable storage medium that stores the control procedures of the present invention.

The CPU 1601 is connected with the laser light source 101 of FIG. 1. Although the laser light source 101 is directly connected with the CPU 1601 in FIG. 21 for simplifying the description, it may be connected with the CPU 1601 via a known interface. In another case, the laser light source 101 may be connected with the CPU 1601 via the network interface 1607 and a network 1608.

The network interface 1607 may be achieved by using communication standards, such as the wire-communication standards IEEE 802.3 or the wireless-communication standards IEEE 802.11 or 802.15. The CPU 1601 can communicate with other devices 1104 and 1121 via the network interface 1607. The devices 1104 and 1121 may be a centralized control device and a management server, which perform control and logging for a performance using the display device.

In addition, the control system of FIG. 21 includes a user interface (UI) device 1604. The UI device 1604 includes an operation unit and a display device. The operation unit may be a terminal such as a handy terminal, or a device such as a keyboard, a jog dial, a pointing device or the like. Alternatively, the operation unit may be a control terminal including a keyboard, a jog dial, a pointing device or the like. The display device may be any display device, such as a liquid crystal display, as long as the display device can display messages or images.

The display device of the UI device 1604 may display various types of data on driving conditions of the laser light source 101. In addition, the display device of the UI device 1604 may display an image corresponding to a three-dimensional image that is being displayed in the air by the laser display device of the present embodiment. In this case, the display device of the UI device 1604 may display the driving conditions of the laser light source 101, together with the image corresponding to the three-dimensional image that is being displayed in the air.

Figure 4:
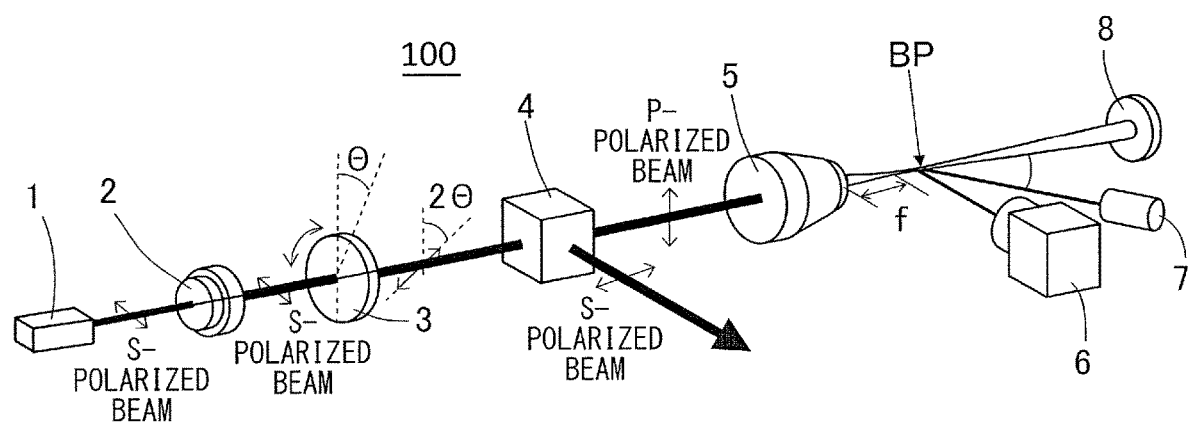
FIG. 4 is a diagram specifically illustrating an example of a configuration of a display device of an embodiment of the present invention.

In FIG. 21, a measuring instrument 1605 corresponds to a measurement system illustrated in FIG. 4 and including a high-speed camera 6, a spectrometer 7, and a calorie meter 8. The measuring instrument 1605 can be used by the CPU 1601 that determines the laser irradiation intensity in a closed loop control. The high-speed camera 6, the spectrometer 7, and the calorie meter 8 of the measuring instrument 1605 will be described in detail in the later-described second embodiment.

Figure 2:
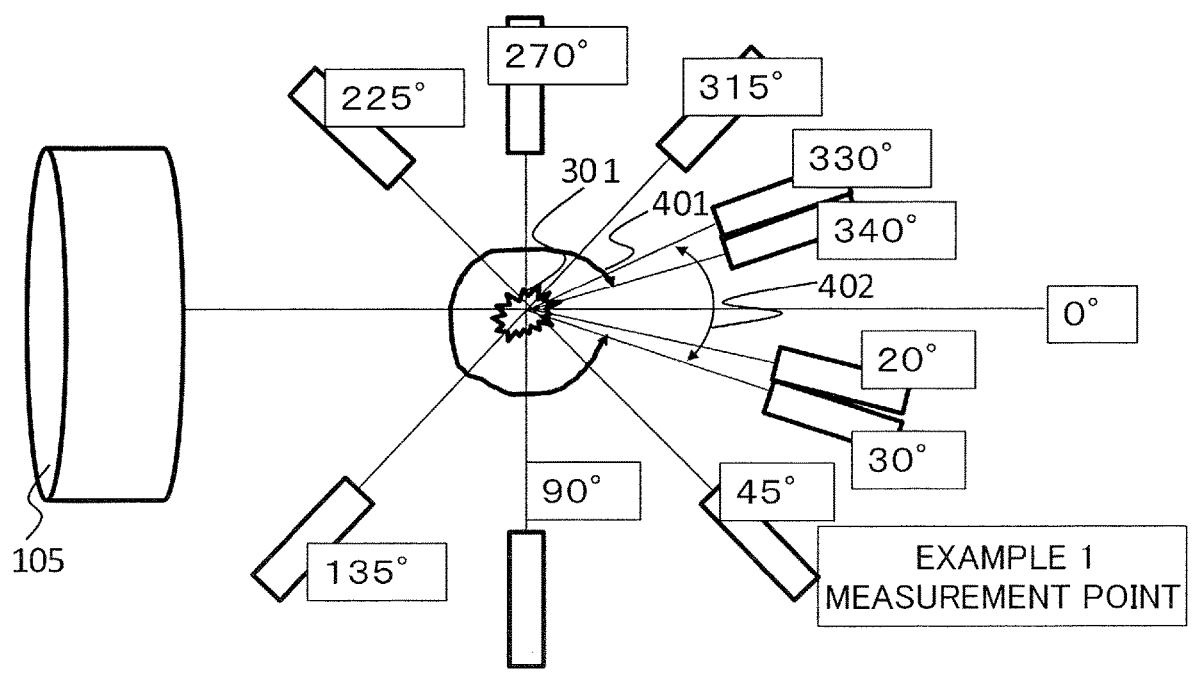
FIG. 2 is a diagram illustrating a field of observation for the display device of the embodiment of the present invention.

FIG. 2 illustrates arrangement of spectrometers. In this arrangement, the irradiation direction (optical-axis direction) of the condensing lens 105 is defined as 0°, and the spectrometers are arranged clockwise at observation angles of 20°, 30°, 45°, . . . . Here, it was confirmed that when the irradiation energy of the laser beam is adjusted by using the polarizing plate 103 and the beam splitter 104, there is an observation range in which observers can visually identify a green light emitter produced at the display position 301 (FIG. 13 which will be described later). The light emitter is a space in which the laser beam is intensely scattered.

Figure 9:
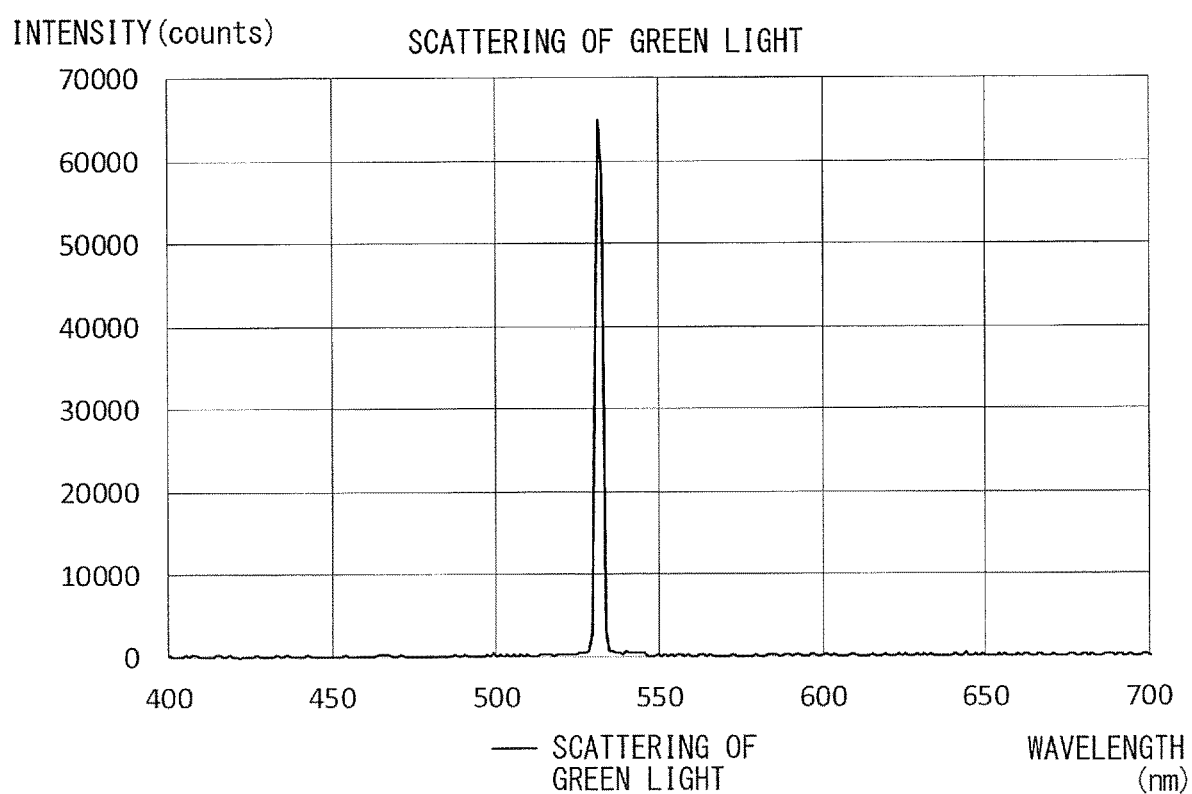
FIG. 9 is a graph illustrating spectra obtained when a light emitter was produced in the air by a laser beam having a wavelength of 532 nm and emitted from the display device of the embodiment of the present invention and the light emitted from the light emitter was measured by a spectrometer for 200 ms at an angle of 45° with respect to an irradiation direction.

When the green light emitter was measured, the spectra of FIG. 9 was obtained. In the measurement, the green light emitter was produced by the laser beam with a laser power of 1500 mW, and measured for a period of time of 200 ms by using a spectrometer (such as AvaSpec-ULS2048CL made by Avantes), at a point separated from the light source by 50 mm and a measurement angle of 45° (illustrated in FIG. 2). In the spectra of FIG. 9, the spectrum of light at or near 532 nm, which is a wavelength of the laser beam from the light source, was detected larger than the others having different wavelengths. This result agrees with the fact that a green color was visually identified by observers in the display (observation) direction.

Figure 10:
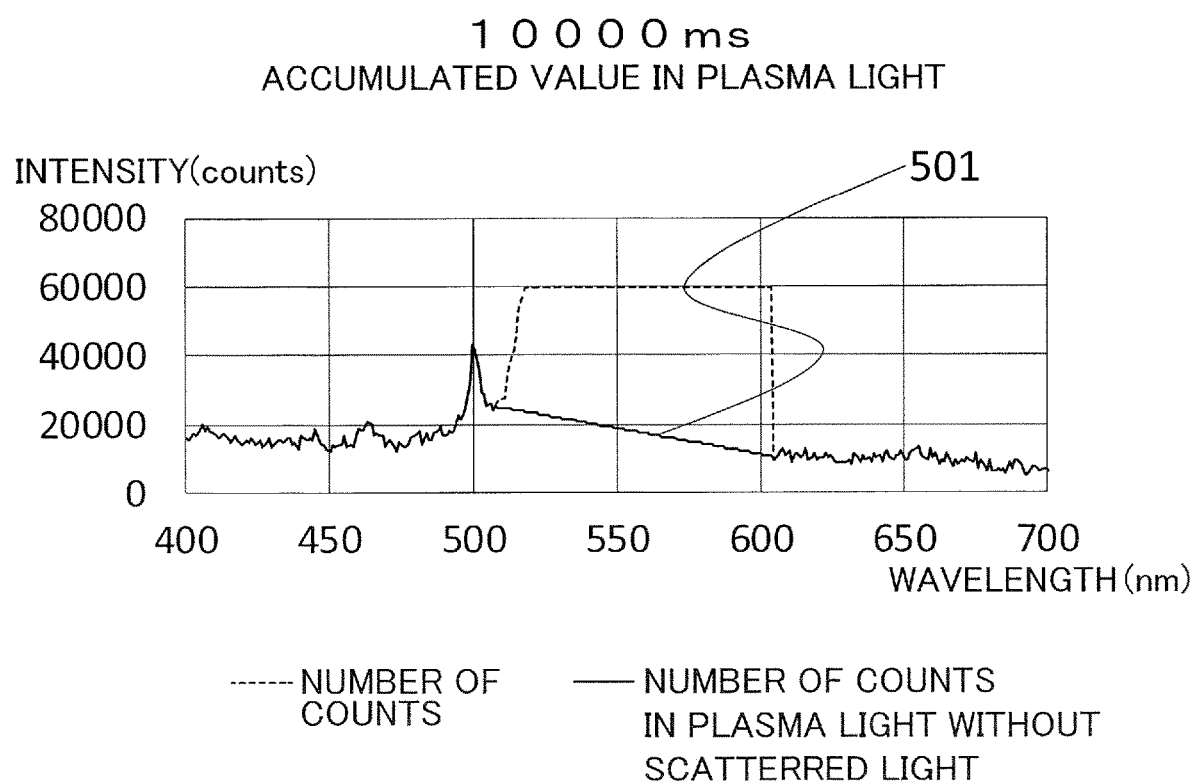
FIG. 10 is a graph illustrating spectra obtained when the light emitter was produced in the air by the laser beam having a wavelength of 532 nm and emitted from the display device of the embodiment of the present invention and the light emitted from the light emitter was measured by the spectrometer for 10,000 ms at the angle of 45° with respect to the irradiation direction.
Figure 11:
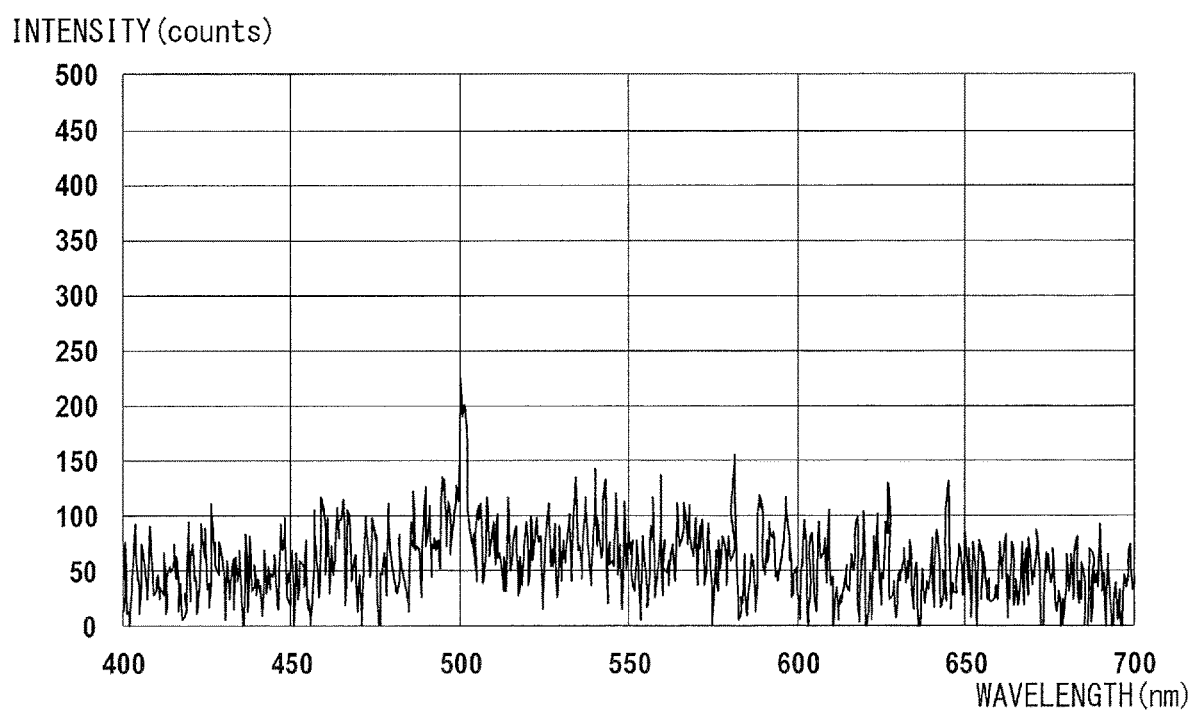
FIG. 11 is a graph illustrating spectra obtained when plasma produced in the air by a laser beam was measured by the spectrometer.

However, forming the green light emitter (i.e. space in which the laser beam is intensely scattered) in the air by focusing the green laser beam (532 nm) requires a certain condition. Here, in the spectral measurement data of FIG. 9, components of visible light having other wavelengths are slightly contained. Since the components of visible light are slight, another spectral measurement was performed for a period of 10,000 ms (10 s). FIG. 10 is a graph illustrating the result of the measurement. In FIG. 10, it is understood that the light was produced in a wide wavelength range of visible light. By the way, FIG. 11 is a graph illustrating a result of measuring a high-density plasma light emitter that involves a flash and an impact sound, as described in Japanese Patent Application Publication No. 2003-233339. In comparison between FIG. 10 and FIG. 11, since the spectra of FIG. 10 are similar to those of FIG. 11, it is conceivable that slight amount of plasma light was produced in the measurement, which was performed in the present embodiment and the result of which is illustrated in FIG. 10.

That is, one of conditions to form a colored (e.g. green) visible light emitter in the air is to produce a weak-plasma space in the air by controlling the power of the visible laser beam. Specifically, since the weak plasma has its refractive index slightly different from that of a gas (i.e. air in the present embodiment), the plasma produces a scattering field of light that scatters the colored (green) laser beam and serves as the colored (green) light emitter. Thus, since the light emitter is formed by using the weak plasma, the noise caused by the occurrence of plasma is hardly produced. Consequently, the display device will be able to be used also in an office or other environments, like ordinary display devices including liquid crystal displays.

The present inventors conducted an experiment on combinations of the emission intensity of plasma light and the scattered-light intensity of visible laser beam that allow observers to identify a colored (green) light emitter, and obtained the result illustrated in FIG. 14. In this experiment, the present inventors measured the emission intensity every 1 nm in a wavelength range equal to or larger than 380 nm and equal to or smaller than 780 nm, converted the emission intensity to XYZ tristimulus values of CIE 1931, and determined a ratio of a Y value of only the plasma light to a Y value of the scattered light produced from the visible laser beam and containing no plasma light.

As a result of the experiment conducted by the present inventors, for allowing average observers to visually identify the colored (green) light emitter, it is necessary to set the laser irradiation condition so that the ratio of the Y value of only the plasma light to the Y value of the scattered light produced from the visible laser beam and containing no plasma light is equal to or larger than 1% and equal to or smaller than 95%. For example, if the ratio of the Y value of only the plasma light to the Y value of the scattered light produced from the visible laser beam and containing no plasma light is smaller than 1%, observers will hardly identify the colored scattered light because the scattering plasma field is weak and thus the laser beam is hardly scattered. More preferably, the ratio is equal to or larger than 25%. When the ratio is in this range, observers will visually identify the colored light emitter with ease. In contrast, if the ratio of the Y value of only the plasma light to the Y value of the scattered light produced from the visible laser beam and containing no plasma light is larger than 95%, the intensity of the colored scattered light becomes smaller than that of the white plasma light because the intensity of the plasma light is too large. Thus, even though the colored scattered light is mixed, observers will identify the color of the light emitter as white. When the Y value of the scattered light produced from the visible laser beam (which is green as illustrated in FIG. 9) and containing no plasma light is measured, the Y value is a value of the scattered light itself produced from the colored (green) laser beam. Thus, when the laser beam with a wavelength of 532 nm is used, the spectrometers are arranged as illustrated in FIG. 2, and the output data from each spectrometer is processed such that pieces of data obtained in a wavelength range (522 to 542 nm in this case) are employed and the other data is regarded as zero. Here, the wavelength range from 522 to 542 nm is a range from a value that is 10 nm smaller than the wavelength of the laser beam, to a value that is 10 nm larger than the wavelength of the laser beam.

Regarding the Y value of only the plasma light, since the plasma light is slight when the colored light emitter is identified, the Y value is measured with an accumulated measurement time of 10,000 ms, for example. In this measurement, however, the intensity of the colored scattered laser beam is increased. Specifically, as illustrated in FIG. 10, the base line of the intensity of the scattered laser beam increases in a range from about 515 to 603 nm. Thus, if XYZ values are calculated in this state, the values will be significantly affected by the scattered laser beam. This is because the intensity of the scattered laser beam is too large compared to the intensity of the plasma light. As a result, the scattered laser beam disadvantageously affects the spectra of the plasma light in a wavelength range of the scattered laser beam. Thus, even when a spectrum of 532 nm is eliminated, the Y value obtained from the remaining spectra will differ from the Y value of only the plasma light because the intensity of the base line is still too large. As countermeasures to this problem, the following procedures are performed for calculating the Y value of only the plasma light. First, the spectra from a spectrometer are checked, and one wavelength is determined. Specifically, the light intensity (i.e. the number of counts in the present embodiment) at 10 nm longer wavelength than the wavelength is twice the light intensity at the wavelength. In an experiment performed in the present embodiment, the number of counts was 1061 at 515 nm, and was 521 at 505 nm.

Then, the spectra from the spectrometer is checked, and another wavelength is determined. Specifically, the light intensity (i.e. the number of counts in the present embodiment) at 10 nm longer wavelength than the another wavelength is half the light intensity at the another wavelength. In the experiment performed in the present embodiment, the number of counts was 1190 at 603 nm, and was 212 at 613 nm. While the wavelength of the laser beam is 532 nm, the width of the base line is increased through the accumulation, to a range from 515 to 603 nm.

If the spectra in the base line from 515 to 603 nm are removed and set to zero, the Y value obtained from the resulting spectra will become lower than the Y value of the only plasma light. Thus, for obtaining a curve of the counts of only the plasma light (e.g. FIG. 11), the following procedures are performed. First, a straight line 501 is drawn between a counts value at the wavelength of 505 nm and a counts value at the wavelength of 613 nm. Then, by using the straight line 501, the number of counts is determined for every 1 nm in a range from the wavelength of 505 nm to the wavelength of 613 nm. In FIG. 10 of the present embodiment, since the measurement was performed for a period of time 50 times longer than the period of time in which the colored scattered laser beam was measured (FIG. 9), the number of counts for each wavelength is divided by 50, and then XYZ values are calculated for determining the Y value of only the plasma light.

Here, if the intensity of the plasma light is high and the intensity of the colored scattered laser beam is lower than the intensity of the plasma light, the measurement time may not be made longer. By the way, the XYZ values (tristimulus values) of CIE 1931 are indexes indicating intensities of red, green, and blue colors of light in a wavelength range of visible light. The indexes are values experimentally determined in accordance with the sensitivity of human eyes. In particular, the Y value is an index indicating color brightness.

In the present embodiment, each display state is evaluated not by the intensity of light at each wavelength, but by the XYZ tristimulus values because the state is required to be visually identified by humans. Thus, the XYZ tristimulus values are optimum for the means by which humans express the color and the intensity of light.

Next, direction dependence of light sent from the light emitter will be described. In the present embodiment, as illustrated in FIG. 2, a forward scattering direction 402 has an angle range that is equal to or larger than 0° and smaller than 30° and larger than 330° and equal to or smaller than 360°, with respect to the optical-axis direction of the condensing lens 105. On the other hand, in the present embodiment, a display angle range 401 of FIG. 2 is a preferable range in which the laser beam scattered at the display position 301 can be observed with high color purity. Specifically, the display angle range 401 is a range other than the above-described forward scattering direction 402, and is equal to or larger than 30° and equal to or smaller than 330°.

In an experiment to produce the plasma light by using an invisible laser beam, the present inventors confirmed that when the plasma light produced in the air is observed from the above-described forward scattering direction, not a white color of the plasma light but a green color is observed. The wavelength of light of the green color is about 500 nm. The emission color is probably produced when atoms or molecules of nitrogen and oxygen of the air enter a plasma state, but why the color of the plasma light becomes green in the forward scattering direction is unknown. However, it is understood from this experiment that the display direction (observation direction) is important to control the display color.

For example, when a light emitter produced by using the green laser beam is observed in the forward scattering direction, the scattered laser beam at 532 nm and the plasma light at about 500 nm are mixed with each other. The plasma light is produced due to the composition of the air. Thus, XY values of a light emitting pixel are different from those of the green laser beam although the light emitting pixel displays greenish color. Since the emission color is different from the intended color of the laser beam, the desired color is difficult to produce. In addition, when a light emitter produced by using another colored laser beam (red or blue, for example) is observed in the forward scattering direction, which has the angle range equal to or larger than 0° and smaller than 30° and larger than 330° and equal to or smaller than 360° with respect to the laser irradiation direction, the plasma light at about 500 nm (produced due to the composition of the air) and the scattered laser beam are mixed with each other, probably lowering purity of a displayed color.

Thus, in the present embodiment, the display direction is defined as a range other than the forward scattering direction, which is equal to or larger than 0° and smaller than 30° and larger than 330° and equal to or smaller than 360° with respect to the laser irradiation direction. The display direction can prevent the color mixing, and allow observers to identify the color of the light emitter as the color of the colored laser beam from the display device.

Thus, in the present embodiment, the display direction is preferably equal to or larger than 30° and equal to or smaller than 330°, as illustrated in FIG. 2. In the arrangement of the optical axis as illustrated in FIG. 2, a guide may be disposed to define an area in which observers can visually identify the light emitter. In this case, the area is defined so that observers observe the light emitter only in an angle range, for example, equal to or larger than 30° and equal to or smaller than 135°, and equal to or larger than 225° and equal to or smaller than 330°. Alternatively, in the arrangement of the optical axis as illustrated in FIG. 2, a shielding device may be disposed to define the area in which observers can visually identify the light emitter. Also, in this case, the area is defined so that observers observe the light emitter in the angle range equal to or larger than 30° and equal to or smaller than 135°, and equal to or larger than 225° and equal to or smaller than 330°. The shielding device may be a shielding wall, a shielding plate, or a light-shielding plate.

With the arrangement of such a shielding device, the color of the light emitter can be identified as the emission color of the colored laser beam from the display device, without affected by the color mixing of the plasma light produced in the air and the colored scattered laser beam. In contrast, Japanese Patent Application Publication No. 2009-186654 utilizes the color mixing in the above-described forward scattering direction to display an image in liquid. However, for forming an image in the air, the display direction of the image forming device of the present invention is suitable.

Spectral Measurement of Light Emitter

The light emitter produced in the air in the above-described manner was measured by using spectrometers (e.g. AvaSpec-ULS2048CL made by Avantes) as measuring instruments. In the measurement, the light intensity at every wavelength was measured at each of the measurement angles illustrated in FIG. 2. Since the light intensity at each wavelength other than the laser-beam wavelength is extremely low, the measurement was performed for every 1 nm. Here, although the light intensity at each wavelength, outputted from the spectrometer, is the number of counts and thus is different from the brightness, the number of counts can be used as the light intensity.

In this measurement, the laser irradiation direction (i.e. optical-axis direction of the condensing lens 105) was defined as 0°, and the measurement was performed at angles of 20°, 30°, 45°, 90°, 135°, 225°, 270°, 315°, 330°, and 340°. In addition, although FIG. 2 illustrates the angles defined in a plane including the optical axis, the angles used for the measurement (or observation) may be defined in a circumferential direction of a circle formed around the optical axis. Here, the angles defined in the circumferential direction of the circle formed around the optical axis and used for the measurement (or observation) are not intended to limit the present invention.

Calculation of CIE XYZ Tristimulus Values and xy

The XYZ tristimulus values were calculated by substituting the number of counts, obtained through the spectral measurement and in a wavelength range equal to or larger than 380 nm and equal to or smaller than 780 nm, for a CIE numerical value. In the calculation, the color-matching function of (CIE 1931 2-deg, XYZ CMFs) was used, and the data was integrated for every 1 nm.

The xy values were calculated from XYZ values by using the following equations (1) and (2).

$$x = \frac{X}{X+Y+Z} \quad (1)$$

$$y = \frac{Y}{X+Y+Z} \quad (2)$$

Figure 12:
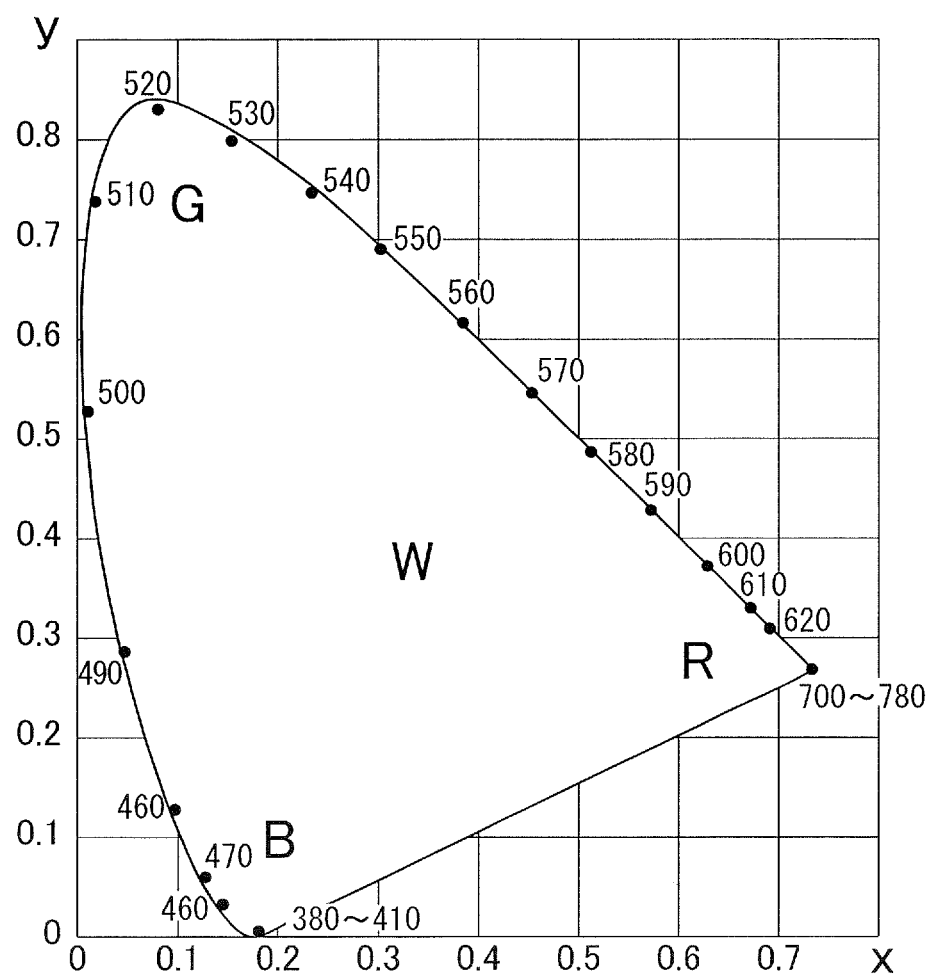
FIG. 12 is a diagram illustrating the XY chromaticity diagram of CIE 1931.

In the equations (1) and (2), parameters x and y represent color, and the color of the light emitter of the present embodiment was determined by using the CIE xy chromaticity diagram (FIG. 12). In the present embodiment, in the xy chromaticity diagram (FIG. 12), a white (colorless) color is obtained when x is in a range from 0.24 to 0.40 and y is in a range from 0.24 to 0.41. In addition, a red color is obtained when x is in a range from 0.50 to 0.74 and y is in a range from 0.20 to 0.35; a green color is obtained when x is in a range from 0 to 0.23 and y is in a range from 0.40 to 0.84; and a blue color is obtained when x is in a range from 0.16 to 0.30 and y is in a range from 0 to 0.30. Here, the CIE xy chromaticity diagram as illustrated in FIG. 12 is originally intended to show colors in a coordinate system by using color representation. In FIG. 12 of the present embodiment, however, for using monochrome representation in the figure, roughly defined areas of white (colorless), red, green, and blue colors are respectively indicated by letters "W", "R", "G", and "B" in the chromaticity diagram.

Displaying Image in the Air

Figure 3:
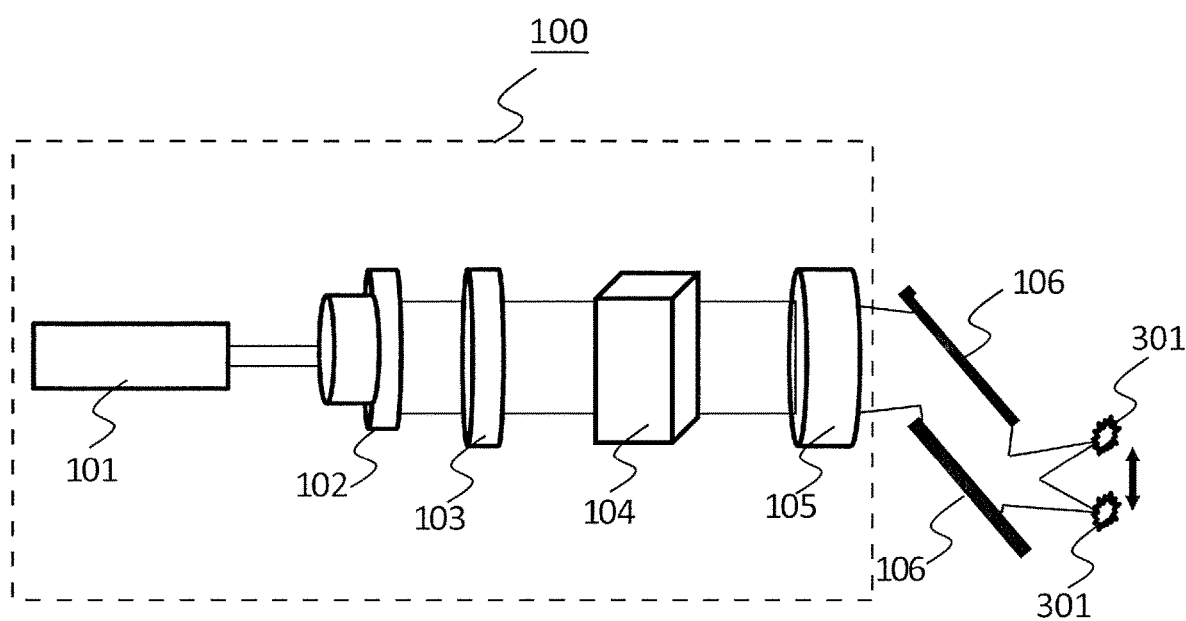
FIG. 3 is a diagram illustrating an example of a configuration for displaying moving or three-dimensional images by using the display device of the embodiment of the present invention.

When an area in the air is scanned with a laser beam to form an image in the air, the laser irradiation device 100 as illustrated in FIG. 3 can be used. In FIG. 3, two mirror devices 106 may be digital galvanometer scanners (e.g. GM-1020 made by Canon Inc.). In addition, a motor driver for the mirror devices 106 may be GC-211 made by Canon Inc. In a basic configuration of the laser irradiation device 100, the diameter of a colored laser beam is increased by the beam expander 102, and the expanded laser beam is focused by the condensing lens 105 that has a focal distance corresponding to a desired display position 301. With this operation, a visible image, that is, a colored (not white) display pixel is formed at the display position 301.

The mirror devices 106 disposed on the beam path moves the focal point to a desired position in the air, and thereby forms an image in the air. The mirror devices 106 may be galvanometer mirrors or polygon mirrors. In addition, when a 2-D or 3-D image is formed in the air, a zoom lens or a movable lens to change the focal distance can be used for changing distance of the display position. Alternatively, another configuration other than the configuration described above as an example may be used for controlling the display position.

Hereinafter, descriptions will be made for conditions which can form, at a display position, a display pixel having substantially the same color as that of a visible laser beam of R (red), G (green), or B (blue) from the laser light source, and which allow observers to observe the color of the display pixel.

In the following examples 1 to 3 and comparative examples 1 to 3, any one of the following laser light sources was used.

Laser Light Source L1
color: green
wavelength: 532 nm (short-pulse laser)
peak power: 100 kW
energy: 60 µJ
repetition frequency: 45 kHz
pulse width: 650 ps
product name: HNG-50F (made by AUTEX INC.)

Laser Light Source L2
color: blue
wavelength: 447 nm (short-pulse laser)
peak power: 100 kW
energy: 60 µJ
repetition frequency: 45 kHz
pulse width: 650 ps
product name: HNG-50F (made by AUTEX INC.)

Laser Light Source L3
color: red
wavelength: 635 nm (short-pulse laser)
peak power: 100 kW
energy: 60 µJ
repetition frequency: 45 kHz
pulse width: 650 ps
product name: HNG-50F (made by AUTEX INC.)

Example 1

In this example, other spectral curves were measured at an angle of 45° while the laser power of the green laser-light source L1 was changed. In addition, a spectral curve was measured at angles illustrated in FIG. 2. Specifically, the laser beam was emitted, and the energy at the focal point was changed by adjusting the polarizing plate and the beam splitter. In this time, the Y value of the light emitter in a range from 522 to 542 nm and the Y value of the plasma light were compared (the measurement position of the light emitter was 45°, and the distance of the light emitter was 50 mm). The laser power was 1500 mW.

The light emitter was able to be identified as a green light emitter in an angle range from 30° to 330°. FIG. 15 illustrates XYZ values of the light emitter calculated from xy values of the light emitter (the XYZ values include values of the scattered laser beam and values of the plasma light). As illustrated in FIG. 15, emission colors identified are all in the green-color range (in the green-color range, x is in a range from 0 to 0.23 and y is in a range from 0.40 to 0.84). In addition, with an appropriate ratio of the Y value of the plasma light from the light emitter to the Y value of the scattered laser beam at or near the wavelength of the laser beam, observers can visually identify the light emitter having not the white color but the emission color (e.g. green) of the laser beam.

In the observation direction having an angle of 20° (left edge in FIG. 15), although a green color was observed, the light at about 500 nm was measured in addition to the light at 532 nm, which is the dominant wavelength of the laser beam. Thus, not the pure green color but a mixed color of the two colors was observed, and the xy values of the mixed color are closer to xy values of the blue color. Such color mixing makes it difficult to adjust the color when full-color images are formed by using red, green, and blue colors. Thus, in the present embodiment, the observation angle from −30° to +30°, defined with respect to 0° that is the irradiation direction (optical-axis direction of the condensing lens 105), is not used. For the purpose of this, a shielding device, such as a shielding wall, a shielding plate, or a light-shielding plate, is disposed to limit the field of observation, in which observers can visually identify the light emitter, to a range equal to or larger than 30° and equal to or smaller than 135°, and equal to or larger than 225° and equal to or smaller than 330°.

In addition, even when the ratio of the Y value of only the plasma light to the Y value of the scattered visible laser beam containing no plasma light exceeds 95% in the forward scattering direction equal to or larger than 0° and smaller than 30°, and larger than 330° and equal to smaller than 360°, the observed color does not become white in the range equal to or larger than 30° and equal to or smaller than 135°, and equal to or larger than 225° and equal to or smaller than 330°. This is because the previously-described phenomenon occurs and the white color of the plasma light is not produced.

When the green display pixel was formed under the irradiation condition of FIG. 15, the noise hardly occurred. Specifically, when a sound pressure level was measured with a precision sound level meter (e.g. TYPE6224 made by ACO CO., LTD) at a position separated from the light emitter by 1 m, the sound pressure level was 40 dB or less. In addition, the device of FIG. 3 was able to form green display pixels by scanning an area in the air, with the laser beam via the galvanometer mirrors; and form an image in the air by using the green display pixels.

Example 2

The conditions of Example 2 are the same as those of Example 1 except that the above-described blue laser-light source L2 was used. Specifically, the laser beam was emitted from the laser light source L2, and the energy at the focal point was changed by adjusting the polarizing plate and the beam splitter so that the ratio of the Y value of the plasma light from the light emitter to the Y value of the scattered laser beam at or near the dominant wavelength of the laser beam was 95% or less. As a result, a blue light emitter was visually identified in the observation angle from 30° to 330° of FIG. 2. FIG. 16 illustrates xy values of the light emitter located at the display position. The xy values were calculated from XYZ values. As illustrated in FIG. 16, emission colors identified were all in the blue-color range (in the blue-color range, x is in a range from 0.16 to 0.30 and y is in a range from 0 to 0.30).

At an observation angle of 20°, a blue-green color that is a mixed color of blue and green was observed (left edge in FIG. 16). Specifically, the light at about 500 nm was emitted in addition to the light at 447 nm, which is the dominant wavelength of the laser beam, and thus the color observed was not the pure blue but a mixed color of blue and green. The xy values are shifted from values of the blue color toward values of the blue-green color. Thus, even when the blue laser-light source is used, the observed color at the angle includes green because atoms or molecules of a gas, such as nitrogen, of the air produce the plasma light.

As can be seen in Example 2, the observation angle range that allows observers to visually identify the light emitter having the color (e.g. blue) of the laser beam, which is neither a mixed color nor a white color, is the same as the observation angle range used for the green laser beam. The observation angle range is a range equal to or larger than 30° and equal to or smaller than 135°, and equal to or larger than 225° and equal to or smaller than 330° with respect to the irradiation direction of 0°. Thus, the observation angle is in the range other than the angle range from −30° to +30°.

Even on the irradiation conditions for the blue laser beam as illustrated in FIG. 16, the noise hardly occurred. Specifically, when a sound pressure level was measured with the precision sound level meter (e.g. TYPE6224 made by ACO CO., LTD) at a position separated from the light emitter by 1 m, the sound pressure level was 40 dB or less. In addition, the device of FIG. 3 was able to form blue display pixels by scanning an area in the air, with the laser beam via the galvanometer mirrors; and form an image in the air by using the blue display pixels.

Example 3

The conditions of Example 3 are the same as those of Example 1 except that the above-described red laser-light source L3 was used. Specifically, the laser beam was emitted from the laser light source L3, and the energy at the focal point was changed by adjusting the polarizing plate and the beam splitter so that the ratio of the Y value of the plasma light to the Y value of the scattered laser beam at or near the dominant wavelength of the laser beam was 50% or less. As a result, a red-light emitter was visually identified in the observation angle from 30° to 330° of FIG. 2. FIG. 17 illustrates xy values of the light emitter located at the display position. The xy values were calculated from XYZ values. As illustrated in FIG. 17, emission colors identified were all in the red-color range (in the red-color range, x is in a range from 0.50 to 0.74 and y is in a range from 0.20 to 0.35).

At an observation angle of 20°, a yellow color (an orange color) that is a mixed color of red and green was observed. Specifically, the light at about 500 nm was emitted in addition to the light at 635 nm, which is the dominant wavelength of the laser beam. Thus, the color observed was not the pure red but a mixed color of red and green. The xy values are shifted from values of the red color toward values of the yellow color. Thus, even when the red laser-light source is used, the observed color at the angle includes green because atoms or molecules of a gas, such as nitrogen, of the air produce the plasma light, as described above.

As can be seen in Example 3, the observation angle range that allows observers to visually identify the light emitter having the color (e.g. red) of the laser beam, which is neither a mixed color nor a white color, is the same as the observation angle range used for the green laser beam. The observation angle range is a range equal to or larger than 30° and equal to or smaller than 135°, and equal to or larger than 225° and equal to or smaller than 330° with respect to the irradiation direction of 0°. Thus, the observation angle is in the range other than the angle range from −30° to +30°.

Even on the irradiation conditions for the red laser beam as illustrated in FIG. 17, the noise hardly occurred. Specifically, when a sound pressure level was measured with the precision sound level meter (e.g. TYPE6224 made by ACO CO., LTD) at a position separated from the light emitter by 1 m, the sound pressure level was 40 dB or less. In addition, the device of FIG. 3 was able to form red display pixels by scanning an area in the air, with the laser beam via the galvanometer mirrors; and form an image in the air by using the red display pixels.

Comparative Example 1

FIG. 18 illustrates an evaluation result in Comparative Example 1. In Comparative Example 1, the green laser-light source L1 and the optical system of Example 1 were used. Specifically, the laser beam was emitted from the laser light source L1, and the energy at the focal point was changed by adjusting the polarizing plate and the beam splitter so that the ratio of the Y value of the plasma light to the Y value of the scattered laser beam at or near the dominant wavelength of the laser beam was more than 95%. As a result, a colorless (white) light emitter was visually identified in the observation angle range from 30° to 330°. In addition, FIG. 18 illustrates xy values calculated from XYZ values. The xy values are all in a range of colorless (white) color, which is different from the range of the green color. That is, even though the green laser beam was used, the observed color became colorless when the ratio of the Y value of the plasma light to the Y value of the scattered laser beam at or near the dominant wavelength of the laser beam exceeded about 95%.

At an angle of 20° (left edge in FIG. 18), a green color was observed. Specifically, not only the light at 532 nm that is the dominant wavelength of the laser beam, but also the light at about 500 nm was observed. The light observed had an emission color different from that of the laser beam. The xy values of the light emitter obtained at this angle are different from those of Example 1. The light at about 500 nm is probably plasma light caused by elements of the air, as described above.

In addition, the noise produced when an image was formed was studied. As a result, when the ratio of the Y value of the plasma light to the Y value of the scattered laser beam at or near the dominant wavelength of the laser beam exceeded 120%, a creep sound started to be slightly heard. Furthermore, when the ratio of the Y value of the plasma light to the Y value of the scattered laser beam at or near the dominant wavelength of the laser beam reached 200%, the noise sounded like an impact sound. When the noise was measured with the precision sound level meter (TYPE6224 made by ACO CO., LTD) at a position separated from the emission point by 1 m, the level of the noise was 90 dB or more.

In addition, the device of FIG. 3 was able to form display pixels by scanning an area in the air, with the laser beam via the galvanometer mirrors; and form an image in the air by using the display pixels. However, the whole image was colorless (white).

Comparative Example 2

FIG. 19 illustrates an evaluation result in Comparative Example 2. In Comparative Example 2, the blue laser-light source L2 and the optical system of Example 1 were used. Specifically, the laser beam was emitted from the laser light source L2, and the energy at the focal point was changed by adjusting the polarizing plate and the beam splitter so that the ratio of the Y value of the plasma light to the Y value of the scattered laser beam at or near the dominant wavelength of the laser beam was about 120%. As a result, a colorless (white) light emitter was visually identified in the observation angle range from 30° to 330°. In addition, FIG. 19 illustrates xy values calculated from XYZ values. The xy values are all in a range of colorless (white) color, which is different from the range of the blue color. That is, even though the blue laser beam was used, the observed color became colorless when the ratio of the Y value of the plasma light to the Y value of the scattered laser beam at or near the dominant wavelength of the laser beam exceeded about 95%.

In addition, in Comparative Example 2, even though the blue laser beam at 447 nm was emitted, a green emission color of light at about 500 nm was observed at an observation angle of 20°. The light at about 500 nm is probably plasma light caused by elements of the air, as described above.

In addition, the noise produced when an image was formed was studied. As a result, when the ratio of the Y value of the plasma light to the Y value of the scattered laser beam at or near the dominant wavelength of the laser beam exceeded 120%, a creep sound started to be slightly heard. Furthermore, when the ratio of the Y value of the plasma light to the Y value of the scattered laser light at or near the dominant wavelength of the laser beam reached 200%, the noise sounded like an impact sound. When the noise was measured with the precision sound level meter (TYPE6224 made by ACO CO., LTD) at a position separated from the emission point by 1 m, the level of the noise was 90 dB or more. In addition, the device of FIG. 3 was able to form display pixels by scanning an area in the air, with the laser beam via the galvanometer mirrors; and form an image in the air by using the display pixels. However, the whole image was colorless (white).

Comparative Example 3

FIG. 20 illustrates an evaluation result in Comparative Example 3. In Comparative Example 3, the red laser-light source L3 and the optical system of Example 1 were used. Specifically, the laser beam was emitted from the laser light source L3, and the energy at the focal point was changed by adjusting the polarizing plate and the beam splitter so that the ratio of the Y value of the plasma light to the Y value of the scattered laser beam at or near the dominant wavelength of the laser beam was about 120%. As a result, a colorless (white) light emitter was visually identified in the observation angle range from 30° to 330°. In addition, FIG. 20 illustrates xy values calculated from XYZ values. The xy values are all in a range of colorless (white) color, which is different from the range of the red color. That is, even though the red laser beam was used, the observed color became colorless when the ratio of the Y value of the plasma light to the Y value of the scattered laser beam at or near the dominant wavelength of the laser beam exceeded about 95%.

In addition, in Comparative Example 3, even though the red laser beam at 635 nm was emitted, a yellow-green color was observed at observation angles of 20° and 340°. The yellow-green emission light, whose wavelength is shifted from a red-light wavelength toward a yellow-and-green light wavelength, is probably plasma light caused by elements of the air, as described above.

In addition, the noise produced when an image was formed was studied. As a result, also in the range of irradiation intensity of Comparative Example 3, when the ratio of the Y value of the plasma light to the Y value of the scattered laser beam at or near the dominant wavelength of the laser beam exceeded 120%, a creep sound started to be slightly heard. Furthermore, when the ratio of the Y value of the plasma light to the Y value of the scattered laser beam at or near the dominant wavelength of the laser beam reached 200%, the noise sounded like an impact sound. When the noise was measured with the precision sound level meter (TYPE6224 made by ACO CO., LTD) at a position separated from the emission point by 1 m, the level of the noise was 90 dB or more.

In addition, the device of FIG. 3 was able to form display pixels by scanning an area in the air, with the laser beam via the galvanometer mirrors; and form an image in the air by using the display pixels. However, the whole image was colorless (white).

Second Embodiment

Measurement of Plasma Formation Threshold

Figure 22:
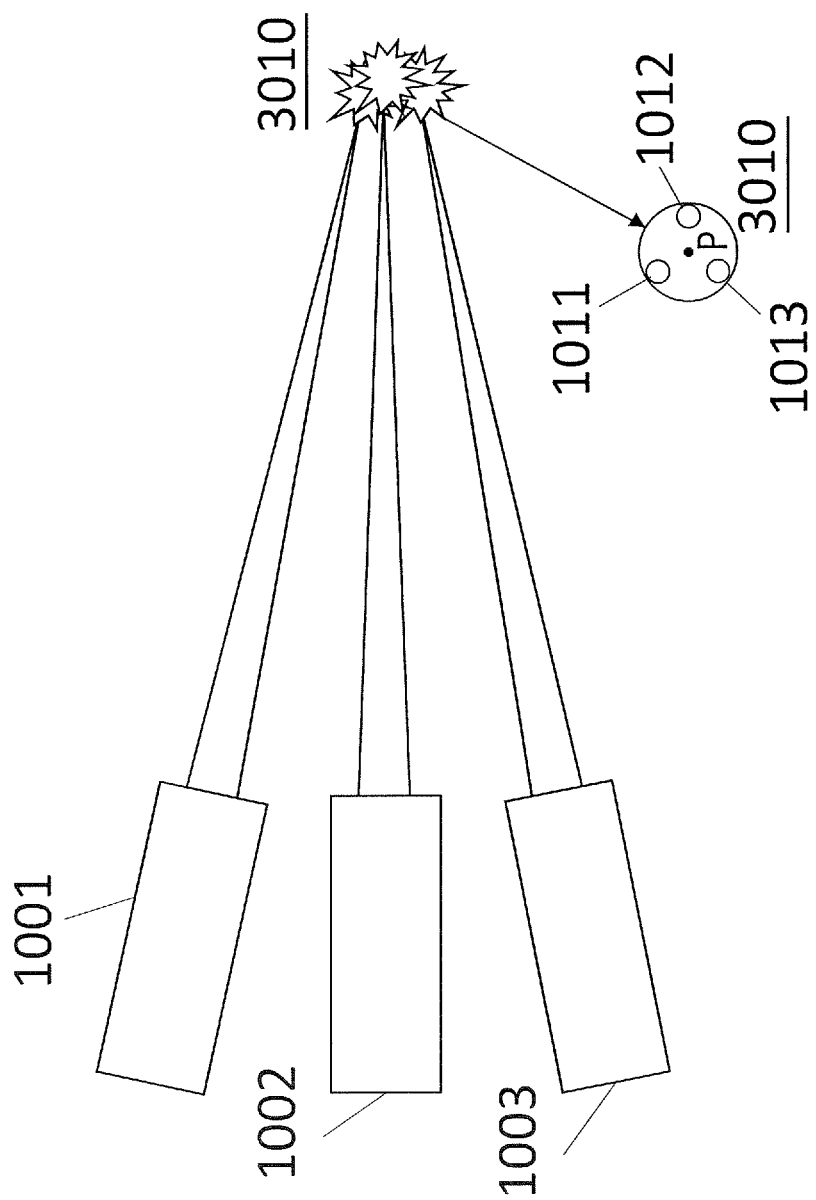
FIG. 22 is a diagram illustrating a schematic configuration of a color-image display device of an embodiment of the present invention.

FIG. 4 illustrates an example of a configuration of a display device that includes a measurement system and a laser power control system. The laser irradiation device of FIG. 4 emits a single-color laser beam. Thus, in the later-described third embodiment, the laser irradiation device of FIG. 4 can be used as each of laser irradiation devices 1001 to 1003 (FIGS. 22 and 23). In addition, laser beams emitted from the color-image display device of the later-described third embodiment and having three colors of RGB do not travel along an identical axis, and irradiation points on which the laser beams are focused are formed around an imaginary display pixel and at different positions. Thus, since each of the later-described laser irradiation devices 1001 to 1003 (FIGS. 22 and 23) includes the following measurement system, the irradiation system for each of the RGB colors can independently control the laser irradiation intensity. This feature is one of the merits in the laser irradiation system that uses the irradiation points, which are spatially independent and not arranged on an identical axis, as described in the third embodiment.

A laser light source 1 of FIG. 4 may be a YAG laser, and the wavelength of the visible laser beam is 532 nm that is a second harmonic. The pulse width of the laser beam from the laser light source 1 is 0.65 ns, the repetition frequency is 12 kHz, and the beam diameter φ measured at a beam output portion is 2 mm. In addition, the laser beam generated by the laser light source 1 is an S-polarized laser beam. The laser beam from the laser light source 1 is sent to a beam expander 2.

Following the beam expander 2, a half-wave plate 3 and a polarized-beam splitter (PBS) 4 are disposed to control the laser energy and a polarized component used for displaying images. The half-wave plate 3 may be a variable half-wave plate that is rotated to select a desired angle at which the beam is polarized. The rotation angle of the half-wave plate 3 is controlled by the CPU 1601 of the control unit 1010. When the half-wave plate 3 is rotated by a rotation angle of θ with respect to the optical axis of the half-wave plate 3, the polarization plane has an angle of 2θ. In this manner, the half-wave plate 3 changes the S-polarized laser beam generated by the laser light source 1, into a laser beam with a P-polarized component. The polarized-beam splitter (PBS) 4 is an optical element that transmits the P-polarized component toward the output direction and totally reflects the S-polarized component.

Thus, the CPU 1601 of the control unit 1010 controls the rotation angle of the half-wave plate 3, and thereby changes the energy of the laser beam outputted from the polarized-beam splitter (PBS) 4. Alternatively, the CPU 1601 of the control unit 1010 may change the driving conditions of the laser light source 1 to change the power of the laser beam focused on a display position BP. In another case, the laser irradiation device 100 may include the other control means 1021 for controlling the laser irradiation intensity, as illustrated in FIG. 1. The control means 1021 may be a component, such as a liquid crystal shutter, that can change light transmittance. Thus, any of the above-described components can be used for controlling the laser irradiation intensity to form a display pixel having a desired color and located at the display position BP.

In addition, the laser irradiation device 100 of FIG. 4 includes the beam expander 2 and a condensing lens 5 for forming a display pixel at the display position BP in the air (at the display position, a desired distance is obtained between the laser irradiation device 100 and the display position BP). The beam expander 2 is an optical element that increases the diameter of the laser beam, and has a magnification of 9 in the present embodiment. The focal distance of the condensing lens 5 is 60 mm. When the distance between the laser irradiation device 100 and the display position BP, at which the display pixel is formed, is changed, a zoom optical system, in which the condensing lens 5 is controlled by a motor or the like, may be used for changing the focal distance. Thus, by using any one or any combination of the above-described components for controlling the laser irradiation intensity, the laser beam is adjusted in energy and focused on the display position BP by the condensing lens 5, to form a high-energy-density area at the display position BP.

The laser irradiation intensity as illustrated in FIG. 9 was measured by the measurement system including the high-speed camera 6, the spectrometer 7, and the calorie meter 8, which were disposed in the configuration of FIG. 4, as measuring instruments. In an actual use of the display device for displaying images, however, the laser irradiation intensity at the display position BP may be controlled in an open loop, on a laser driving condition determined through a pre-conducted experiment.

In addition, in the actually operated display device, measuring instruments, such as the high-speed camera 6, the spectrometer 7, and the calorie meter 8, may be disposed, and the laser irradiation intensity at the display position BP may be controlled in a closed loop. Here, conditions on plasma formation in the air (atmosphere) may be affected by atmospheric pressure, temperature, humidity, and the wavelength of the laser beam from the laser light source 1. For this reason, the arrangement of the above-described measurement system is important to control the laser irradiation intensity (measured at the display position BP) in a closed loop.

The high-speed camera 6 is used to observe a produced plasma state. The spectrometer 7 is a fiber-probe high-speed spectrometer (such as AvaSpec-ULS2048CL made by Avantes) to measure the intensity of light, sent from the emission point, for every wavelength. The calorie meter 8 measures the laser power (which may be commonly called laser energy) produced at the focal point; and indicates a measurement result, obtained in a certain measurement time, as a laser energy value W [J/s]. In principle, the calorie meter 8 absorbs laser light and converts it to heat to measure the power of the laser beam. For example, the calorie meter 8 may be a meter in which a sensor body, LA40 (150) A made by Ophir Optronics, is attached to a control-and-display unit, such as StarBright.

Hereinafter, a method of calculating a power density I [W/m²] of the laser beam that corresponds to a plasma formation threshold will be described. The power density may be commonly called an energy density. First, a measurement value by the calorie meter 8 is divided by a repetition frequency F [Hz] of the pulse laser beam to obtain an energy value J [J] per pulse. Then the energy value J is divided by a pulse width [s] to obtain a peak power value Pp [W] of the laser beam. Here, since the rise and fall of the laser beam pulse are extremely sharp, the average power value obtained by dividing the energy value J by the pulse width [s] is substantially equal to the peak power value Pp. Then the peak power value Pp is divided by a beam spot area S obtained at the focal point, to obtain an energy density (W/m²). The beam spot area S can be measured by using a knife-edge-based beam profiler (e.g. BEAMMASTER-USB made by Coherent, Inc). Since the knife-edge-based beam profiler has a resolution of 0.1 μm, it can measure a beam diameter of even a few micrometers. The diameter of the laser beam spot can be calculated by using the following equation:

$$d = 4f\lambda M^2/n\pi D$$

where d [μm] is a diameter of the laser beam spot, f [mm] is a focal distance of the condensing lens, λ [μm] is a wavelength of the laser beam, D [mm] is a diameter of the laser beam obtained before the laser beam is condensed, M² is a beam quality, and n is a refractive index of the air. Thus, the laser beam spot area S may be calculated by using the diameter d and the following equation:

$$S = \pi \cdot (d/2)^2$$

Whether plasma is produced can be identified visually at the laser focal point, or by detecting scattered spectra of the incident laser beam by using the above-described fiber-probe high-speed spectrometer 7.

In the arrangement of FIG. 4, the calorie meter 8 is disposed in front of the display position BP. However, when the laser energy is actually measured in a preparatory experiment for example, the calorie meter 8 may be disposed at an output portion of the condensing lens 5 for measuring the laser power. Thus, the energy corresponding to the plasma formation threshold can be identified by adjusting the laser energy measured at the output portion of the condensing lens 5.

Figure 5:
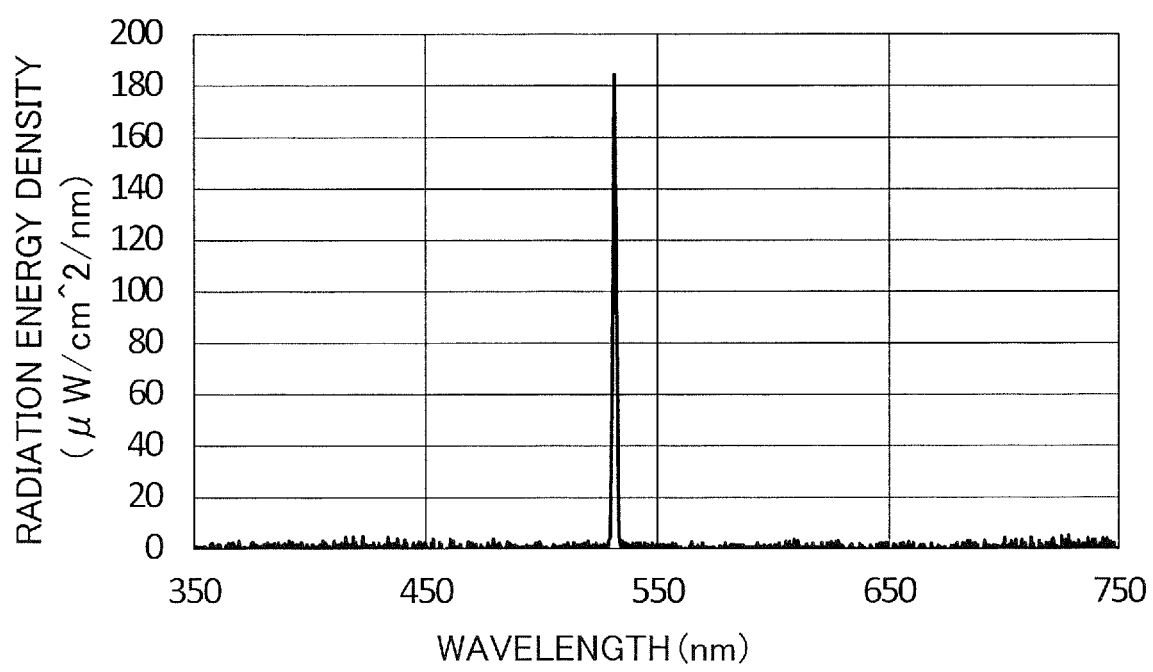
FIG. 5 is a graph of irradiation energy density of the display device of the embodiment of the present invention, defined as radiant energy density measured in an accumulated time of 2 ms by a spectrometer.
Figure 6:
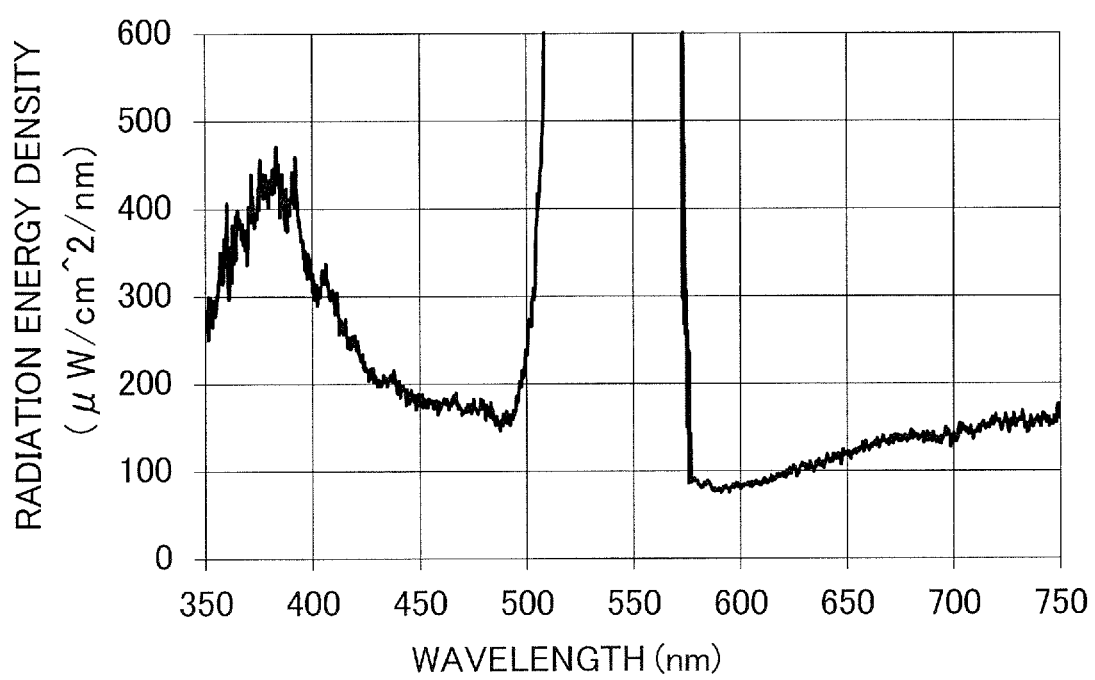
FIG. 6 is a graph of irradiation energy density of the display device of the embodiment of the present invention, defined as radiant energy density measured in an accumulated time of 1 s by a spectrometer.

FIG. 5 illustrates spectra of the energy of the laser beam (wavelength: 532 nm) and other components produced at the display position BP, and obtained in the configuration of FIG. 4 and in an accumulated time of 2 ms, by the spectrometer 7. In the measurement time in FIG. 5, only the scattered laser beam was observed. However, in a measurement time of 1 s in the spectrometer 7, as illustrated in FIG. 6, a broad range of emission spectra was observed, including the spectrum at 532 nm that is a wavelength of the incident laser beam. This broad emission spectra are characteristic emission spectra obtained when plasma is produced.

When the dependence of the emission spectra to the energy of the incident laser beam was measured by using the device of FIG. 4, the energy corresponding to the plasma formation threshold was 1.1 W. In addition, when the plasma light was not observed, the scattered laser beam produced from the incident laser beam at 532 nm was also not observed. That is, the plasma light is required for forming a (colored) display pixel by scattering the incident laser beam. When the plasma formation threshold was calculated as a peak value of an energy density per pulse, which was obtained at the display position, it was 2.6 TW/cm². The cross-sectional area of the incident laser beam is decreased by the condensing lens 5 more as the laser beam travels along the optical axis of the condensing lens 5. When the power density of the laser beam, which is reduced in the cross-sectional area, exceeds the above-described threshold at the display position BP, weak plasma occurs at the display position BP, scattering the visible laser beam.

Relationship Between Scattered-Light Intensity and Laser Beam Power

Figure 7:
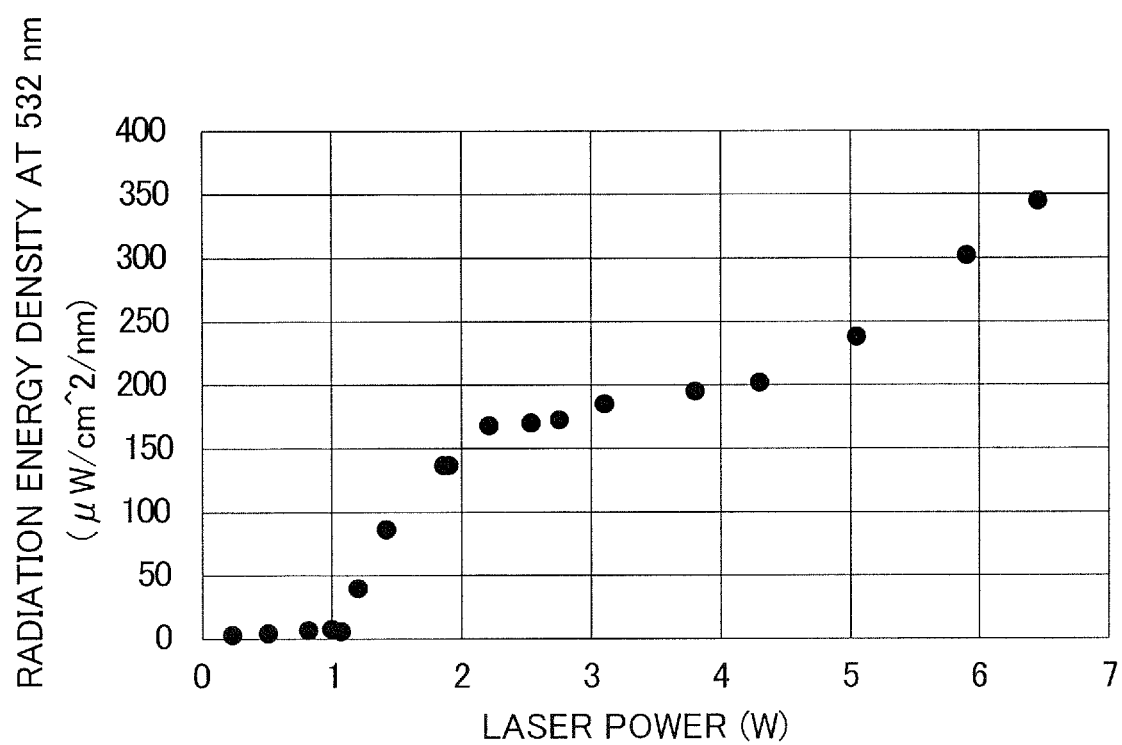
FIG. 7 is a graph illustrating a relationship between the radiant energy density and the laser beam power of the display device of the embodiment of the present invention, obtained at a wavelength of the laser beam.
Figure 8:
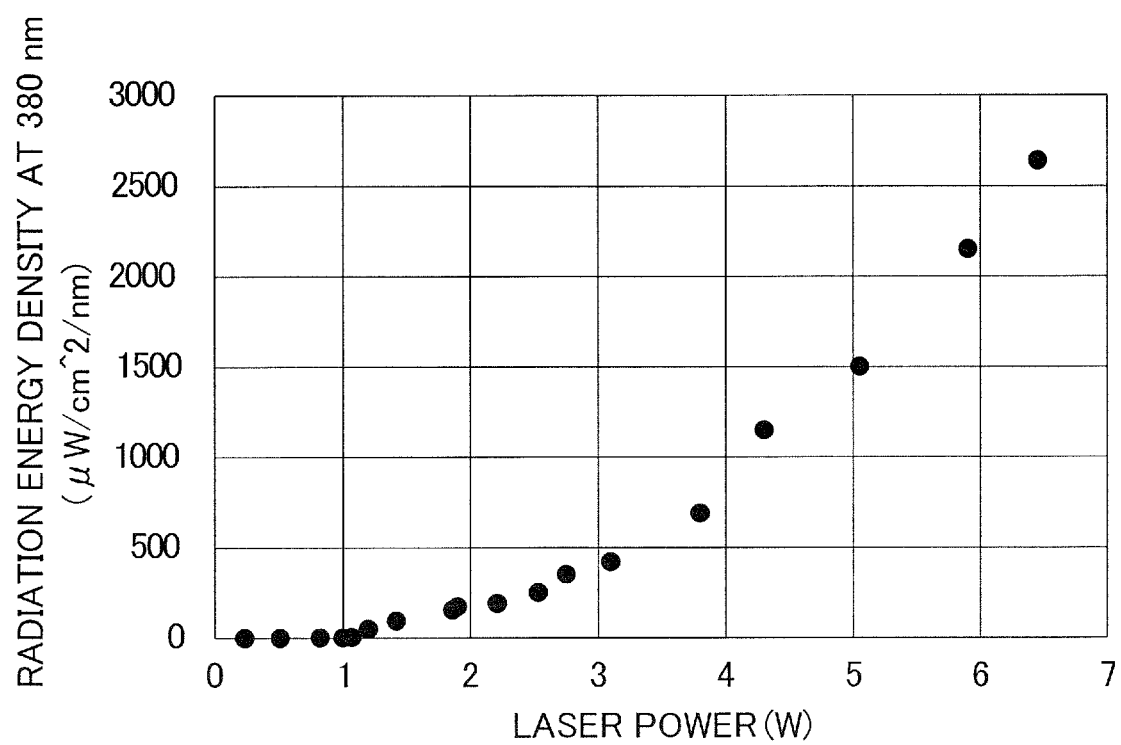
FIG. 8 is a graph illustrating a relationship between the radiant energy density, the scale of which is different from that of FIG. 7, and the laser beam power of the display device of the embodiment of the present invention, obtained at another wavelength of the laser beam.

FIG. 7 illustrates the scattered-light intensity that changes with the laser beam power. The scattered-light intensity is the intensity of the scattered laser beam produced from the incident laser beam, and the laser beam power is the power of the laser beam emitted from the laser light source 1 through the condensing lens 5. As illustrated in FIG. 7, the scattered-light intensity represented by the vertical axis rises at a laser beam power of about 1 W, and becomes stable in a range of the laser beam power from about 2 to 4 (or 5) W. In a range of the laser beam power equal to or larger than 4 (or 5) W, the scattered-light intensity, represented by the vertical axis, tends to rise again. On the other hand, FIG. 8 illustrates the intensity of the plasma light (380 nm), measured in a range equal to the range of the laser beam power of FIG. 7. As illustrated in FIG. 8, the intensity of the plasma light tends to monotonously increase as the laser beam power increases.

As can be seen from FIGS. 7 and 8, in the above-described configuration, it is preferable that the laser beam power is selected in a range from about 1 to 2 W. This is because, in the range, the intensity of the scattered laser beam rises and becomes stable while the intensity of the plasma light is not high.

FIG. 13 illustrates one example of results of an experiment, conducted by using the configuration of FIG. 4. In this experiment, the wavelength of the laser beam from the laser light source 1 was 532 nm (i.e. a second harmonic in a YAG laser), the pulse width of the laser beam was 0.65 ns, and the magnification of the beam expander 2 was 9. In addition, in a state where the beam position was fixed in the air, the intensity of the scattered laser beam was measured for a continuous 10 s, with an acquisition time of 1 ms, by using the fiber-probe high-speed spectrometer 7. In this time, the light emitter was observed. FIG. 13 illustrates how the light emitter was visually identified when the laser power was changed.

As illustrated in FIG. 13, when the laser irradiation intensity is controlled by the CPU 1601 so that the power density at the display position is in a range equal to or larger than 1.5 times the plasma formation threshold, and equal to or smaller than 4 times the plasma formation threshold, the intensity of the scattered laser beam that can be visibly and stably identified can be obtained. With this control, the light emitter with a desired (green) color can be formed at the display position BP, stably displaying the emission color. In addition, when a color image was formed by using the scanning system of FIG. 3 and scanning an area in the air with the laser beam, a target color was able to be produced with good reproducibility.

The above-described plasma formation threshold may be set in accordance with at least one of a laser spot diameter, a pulse width, and a wavelength of the laser beam emitted from the laser irradiation device.

Here, other factors that can affect the scattered-light intensity include stability in the laser beam power produced from the laser light source, change in beam shape caused by the change in the optical system, composition of the air, and temperature and humidity. However, if the measurement system (the high-speed camera 6, the spectrometer 7, and the calorie meter 8) illustrated in FIG. 4 is disposed even in an actually used display device and controlled so that the laser irradiation intensity is in the above-described range, the scattered-light intensity and the emission color for displaying images will become stable. In this case, the laser irradiation intensity may be controlled in a closed loop, while an image is being displayed, in accordance with output from the measurement system (the high-speed camera 6, the spectrometer 7, and the calorie meter 8) illustrated in FIG. 4. In another case, the laser irradiation intensity may be controlled in the closed loop, while an image is being displayed, in accordance with the output from the measurement system (the high-speed camera 6, the spectrometer 7, and the calorie meter 8) illustrated in FIG. 4, at a timing when the display device is initially installed or maintenance is performed on the display device.

Third Embodiment

In the above description, the configuration to form a primary-color pixel required for displaying color images in the air has been described. The primary-color pixel is formed by using a visible laser beam, and the color of the pixel is the same as a single emission color of the laser beam. Hereinafter, laser irradiation devices that independently control and emit visible laser beams having the three primary colors of RGB will be described. A color-image display device described below irradiates irradiation points located in the vicinity of a display position of a pixel, with respective laser beams having the three primary colors of RGB; and forms a color pixel having any emission color, at the display position by using the additive color mixing.

Configuration of Device

As illustrated in FIGS. 22 and 23, a color-image display device of the present embodiment includes laser irradiation devices 1001, 1002, and 1003. Each of the laser irradiation devices 1001, 1002, and 1003 has the same basic configuration as that of the laser irradiation device 100, which is illustrated in FIGS. 1 to 4 of the first and the second embodiments. As an example, the wavelength of the laser beam from the laser light source of the laser irradiation device 1001 is 532 nm (green), the wavelength of the laser beam from the laser light source of the laser irradiation device 1002 is 635 nm (red), and the wavelength of the laser beam from the laser light source of the laser irradiation device 1003 is 447 nm (blue).

The color-image display device illustrated in FIGS. 22 and 23 irradiates irradiation points located in the vicinity of a display position of a pixel, with respective laser beams having the different colors; and forms a full-color display pixel at the display position by using the additive color mixing that mixes scattered beams with each other. Here, in the present embodiment, since the emission color from the full-color display pixel is observed by humans, the emission color from the full-color display pixel formed in the air is in a wavelength range of visible light for humans. In the present embodiment, the laser beams have emission colors which are substantially red (R), green (G), and blue (B) colors; and any color is displayed by using the laser beams, depending on the additive color mixing. Here, since the above-described wavelengths for emission colors are examples, different wavelengths may be used in accordance with use of the device, as wavelengths of visible laser beams that are used for displaying images depending on the additive color mixing.

As described in the first and the second embodiments, when the laser irradiation device 1001 emits the laser beam having an emission color at 532 nm (green), the laser power is controlled so that the intensity of the plasma light is suppressed. With this control, a display pixel can be formed so that the color deviation from the emission color of the laser beam is suppressed. In this case, the observation direction that is suitable for the display pixel is the direction as illustrated in FIG. 2.

For example, the laser irradiation device 1001 irradiates an irradiation point separated from the light source by 50 mm, with a laser beam having a laser power of 1500 mW. When the light emitter produced at the irradiation point is measured by using the spectrometer (AvaSpec-ULS2048CL), at an angle of 45°, for 200 ms, a peak appears at a wavelength of the laser beam of 532 nm in the emission spectrum, as illustrated in FIG. 5. In addition, at a display pixel formed at an irradiation point (display position) by the red laser beam having a wavelength of 635 nm and emitted from the laser irradiation device 1002, the light at about 635 nm is intensely scattered. Furthermore, at a display pixel formed at an irradiation point (display position) by the blue laser beam having a wavelength of 447 nm and emitted from the laser irradiation device 1003, the light at about 447 nm is intensely scattered.

As illustrated in FIGS. 22 and 23, laser beams from the laser irradiation devices 1001, 1002, and 1003 are respectively focused on irradiation points 1011, 1012, and 1013, which are positioned around a center point P of a display position 3010 and different from each other. Then, weak plasma is produced at each of the irradiation points 1011, 1012, and 1013, and the laser beams having colors of R, G, and B are each scattered by the weak plasma, so that light emitters of R, G, and B are formed in the vicinity of the respective irradiation points.

The distance between the center point P and the irradiation points 1011, 1012, and 1013 has a very small value, for example, in a range from one to a few millimeters, although it varies depending on an observation distance between observers and the light emitter. With this arrangement, observers who observe the light emitter located at the display position 3010 will identify the light emitter, as a light emitter having a mixed color of RGB.

For example, when red light is mixed with green light, a yellowish display color will be obtained on the principle of the additive color mixing. The display principle is the same as the principle applied to two-dimensional displays. That is, in the latter principle, even though colors of dots do not overlap with each other in a microscopic view, observers will identify those colors as an additionally mixed color when the dots with colors are sufficiently close to each other and the observers observe the dots at a position separated from the dots by an appropriate distance.

In addition, the color-image display device as illustrated in FIGS. 22 and 23 can appropriately adjust the scattered-light intensity and a plasma area corresponding to each color and produced in each of the irradiation points 1011, 1012, and 1013; and thereby can form a color pixel, which can display any color, in the air. The scattered-light intensity at the irradiation points 1011, 1012, and 1013 can be controlled by adjusting the output of the laser irradiation devices 1001, 1002, and 1003. In addition, the size of the light emitter can be controlled by adjusting the level of focusing of each of condensing lenses 1051, 1052, and 1053 (FIG. 23).

The minimum distance between observers and light emitters whose colors are identified as one color, in which the colors are not separated from each other and additionally mixed with each other, varies depending on the emission intensity and the size of the display system. However, when the observers are separated from the light emitters by a distance at which emission colors affect each other, the effect of the additive color mixing can be obtained.

For example, when a light emitter is formed at an irradiation point by irradiating the irradiation point with a laser beam having a wavelength of 532 nm (e.g. second harmonic in YAG laser beam), a pulse width of 650 ns, and a laser power of 1500 mW, and by using a beam expander 2 (FIG. 4) having a magnification of 9, the size of the light emitter at the irradiation point will be a few millimeters or less. Thus, for causing a plurality of emission colors to affect each other, the light emitters having different colors are arranged closer to each other such that the distance between the light emitters is smaller than the size of the light emitters.

Displaying 3-D or Moving Images in the Air

In the present invention, for displaying 3-D or moving images in the air, an irradiation control device as illustrated in FIG. 23 is used as an image forming means. The irradiation control device of FIG. 23 changes the irradiation direction and/or the image formation distance of the laser beam, emitted from each of the laser irradiation devices 1001, 1002, and 1003; and thereby positions the display position 3010 at any position in the gas (air).

For positioning the display position 3010 at any position in the air, the irradiation control device causes scanning devices 1061, 1062, and 1063 to synchronously scan an area in the air with laser beams emitted from the laser irradiation devices 1001, 1002, and 1003, and moves the positions of the irradiation points 1011, 1012, and 1013. The scanning devices 1061, 1062, and 1063 used for the laser irradiation devices 1001, 1002, and 1003 may be galvanometer mirrors or polygon mirrors, as described with reference to FIG. 3.

In addition, for controlling the display distance, condensing lenses 1051, 1052, and 1053 of the laser irradiation devices 1001, 1002, and 1003 may be used. The condensing lenses 1051, 1052, and 1053 are variable-focal-distance zoom systems, and each correspond to the condensing lens 105 of FIGS. 1 and 3, and the condensing lens 5 of FIG. 4. The amount of zoom of the condensing lenses 1051, 1052, and 1053 is controlled by the control device (CPU 1601 of FIG. 21), via a motor or the like.

Thus, the configuration of FIG. 23 can form a display pixel having any display color, at the display position 3010 that is any three-dimensional position in the air. In addition, the configuration of FIG. 23 can form an image in the air by controlling the scanning devices 1061, 1062, and 1063 and the condensing lenses 1051, 1052, and 1053, and by sequentially changing the position of the display pixel. The image may be a 2D-image or a three-dimensional (3D) image whose shape varies depending on the observation direction.

The configuration of FIG. 23 makes the irradiation points 1011, 1012, and 1013 closer to each other to the extent that the respective observation colors affect each other at the display position 3010, and thereby allows observers to visually identify a display color in which the scattered beams having different colors are mixed with each other at any ratio. In addition, the configuration of FIG. 23 can perform fine adjustments on the irradiation points 1011, 1012, and 1013, which are to be irradiated with the laser beams having different colors. Specifically, the irradiation points 1011, 1012, and 1013 can be made closer to or away from each other by the scanning devices 1061, 1062, and 1063. With this operation, the color and brightness of the light emitter can be changed.

Hereinafter, Examples 4, 5, and 6 and Comparative Example 4 will be described. In those examples, two colors of laser beams were mixed with each other to more specifically study the color mixing performed by the color-image display device of FIG. 22 or 23. In the following examples and comparative example, the laser light sources (L1, L2, and L3) of the laser irradiation devices 1001, 1002, and 1003 were configured as below. Here, the magnification of the beam expander 2 (FIG. 4) was 9. In addition, in the following examples and comparative example, the above-described spectrometer (AvaSpec-ULS2048CL) was used for the spectral measurement.

Laser Light Source L1
color: green
wavelength: 532 nm (short-pulse laser)
peak power: 100 kW
energy: 60 μJ
repetition frequency: 45 kHz
pulse width: 650 ps
product name: HNG-50F (made by AUTEX INC.)
Laser Light Source L2
color: blue
wavelength: 447 nm (short-pulse laser)
peak power: 100 kW
energy: 60 μJ
repetition frequency: 45 kHz
pulse width: 650 ps
product name: HNG-50F (made by AUTEX INC.)
Laser Light Source L3
color: red
wavelength: 635 nm (short-pulse laser)
peak power: 100 kW
energy: 60 μJ
repetition frequency: 45 kHz
pulse width: 650 ps
product name: HNG-50F (made by AUTEX INC.)

Example 4

The irradiation points 1011 and 1012 were respectively irradiated with a laser beam (green) from the laser irradiation device 1001 and a laser beam (red) from the laser irradiation device 1002. Specifically, the irradiation points 1011 and 1012 were irradiated with the laser beams such that the laser power density exceeded the plasma formation threshold at the irradiation points 1011 and 1012. The distance between the irradiation points 1011 and 1012 was 1 mm or less. As a result, observers identified the color of the display pixel located at the display position 3010, as yellow. In the spectra of light sent from the area around the display pixel, high emission peaks were found at 532 and 635 nm. In addition, when the device of FIG. 23 used the above-described light sources and moved the scanning devices 1061 and 1062, a yellow three-dimensional image was able to be formed in the air.

Example 5

The irradiation points 1011 and 1013 were respectively irradiated with a laser beam (green) from the laser irradiation device 1001 and a laser beam (blue) from the laser irradiation device 1003. Specifically, the irradiation points 1011 and 1013 were irradiated with the laser beams such that the laser power density exceeded the plasma formation threshold at the irradiation points 1011 and 1013. The distance between the irradiation points 1011 and 1013 was 1 mm or less. As a result, observers identified the color of the display pixel located at the display position 3010, as cyan. In the spectra of light sent from the area around the display pixel, high emission peaks were found at 532 and 447 nm. In addition, when the device of FIG. 23 used the above-described light sources and moved the scanning devices 1061 and 1063, a cyan three-dimensional image was able to be formed in the air.

Example 6

The irradiation points 1012 and 1013 were respectively irradiated with a laser beam (red) from the laser irradiation device 1002 and a laser beam (blue) from the laser irradiation device 1003. Specifically, the irradiation points 1012 and 1013 were irradiated with the laser beams such that the laser power density exceeded the plasma formation threshold at the irradiation points 1012 and 1013. The distance between the irradiation points 1012 and 1013 was 1 mm or less. As a result, observers identified the color of the display pixel located at the display position 3010, as magenta. In the spectra of light sent from the area around the display pixel, high emission peaks were found at 447 and 635 nm. In addition, when the device of FIG. 23 used the above-described light sources and moved the scanning devices 1062 and 1063, a magenta three-dimensional image was able to be formed in the air.

Comparative Example 4

As described in Examples 4 to 6, when two irradiation points that are sufficiently close to each other are irradiated with respective two colors of laser beams, the two colors are mixed with each other. In this case, observers will observe the mixed color on the principle of the additive color mixing. In the present comparative example, two irradiation points to be irradiated with respective two colors of laser beams were more separated from each other. Here, the present comparative example is intended to be compared with the above-described preferable examples on the basis of the additive color mixing, and thus is not intended to indicate an example that is out of the spirit of the present invention. Thus, the present comparative example can serve as a guide for determining a limit resolution, below which an image may be displayed without color mixing.

In the present comparative example, two irradiation points were irradiated with a laser beam (green) from the laser irradiation device 1001 and a laser beam (red) from the laser irradiation device 1002, and the two irradiation points were separated from each other by 10 mm. That is, the two irradiation points, separated from each other by 10 mm, were irradiated with the laser beams such that the laser power density exceeded the plasma formation threshold at the two irradiation points. In this case, observers visually identified the two display pixels of green and red, as pixels separated from each other. In the spectral measurement, a spectrum at 532 nm (green) and a spectrum at 635 nm (red) were dominantly measured in the spectra of light sent from the two irradiation points, separated from each other by 10 mm; and any spectrum of a mixed color was not detected. Although the center point P of the display pixel is a center between the two irradiation points in theory, observers did not visually identify any mixed color when the irradiation points were separated from each other by 10 mm.

As described above, it is preferable that the color-image display device of Example 3 irradiates irradiation points, located in the vicinity of a display position in the air and separated from each other (by 1 mm or less, for example), with laser beams having different wavelengths and emitted from a plurality of laser irradiation devices, and causes plasma produced in the irradiation points to scatter the laser beams for displaying color images. For example, the color-image display device uses laser beams having the three primary colors; and displays an image having any color, in the air by using the additive color mixing.

In addition, the display position 3010 can be positioned at any position in the air for forming a display pixel having any color, by changing the irradiation direction and/or the image formation distance of the laser beam emitted from each of the laser irradiation devices, by using the irradiation control device as illustrated in FIG. 23. Consequently, not only 2-D still or moving images but also 3-D still or moving images can be displayed in the air.

The present invention may be modified appropriately in design by a person skilled in the art, in details of a device, a system, and software, without limited to the above-described embodiments and examples. In addition, the present invention may be embodied such that a program to achieve one or more functions of the above-described embodiments is supplied to a system or a device via a network or a storage medium and one or more processors of the system or the device read and execute the program. The program may be executed by a circuit (such as an ASIC) that achieves the one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-229461, filed Dec. 6, 2018, Japanese Patent Application No. 2019-023058, filed Feb. 12, 2019, and Japanese Patent Application No. 2019-196784, filed Oct. 29, 2019, which are hereby incorporated by reference herein in their entirety.

What is claimed is:

1. A display device comprising:
    at least one laser irradiation device configured to irradiate an irradiation point located at a display position in air with a laser beam having a wavelength equal to or longer than 380 nm and equal to or shorter than 780 nm and produce a light emitter; and
    a control device configured to control intensity of the laser beam emitted from the at least one laser irradiation device so that the light emitter forms a colored pixel at the display position,
    wherein the light emitter emits light to an angle range equal to or greater than 30° and equal to or less than 330°, the angle range being defined with respect to an irradiation direction of the laser beam from the at least one laser irradiation device.

2. The display device according to claim 1, wherein the at least one laser irradiation device is configured to produce plasma at the display position,
    wherein the control device controls the intensity of the laser beam so that a ratio of a Y value of the plasma light emitted from the plasma at the display position to a Y value of the scattered light produced from the laser beam and containing no plasma light is in a range equal to or greater than 1% and equal to or less than 95%,
    wherein the laser irradiation device irradiates the irradiation point located at the display position with the laser beam,
    wherein the Y value of the plasma light is obtained by converting the intensity of the plasma light at the display position to XYZ tristimulus values in CIE 1931 in a wavelength range equal to or longer than 380 nm and equal to or shorter than 780 nm, and
    wherein the Y value of the scattered light is obtained by converting the intensity of the scattered light at the display position to XYZ tristimulus values in CIE 1931 in the wavelength range equal to or longer than 380 nm and equal to or shorter than 780 nm.

3. The display device according to claim 1, wherein the at least one laser irradiation device comprises a light source of visible laser beam, a beam expander configured to increase a beam diameter of the laser beam outputted from the light source of visible laser beam, and a condensing device configured to focus the laser beam whose beam diameter has been increased by the beam expander, on the display position.

4. The display device according to claim 1, wherein the at least one laser irradiation device further comprises a scanning device configured to change an irradiation direction of the laser beam for changing the display position.

5. The display device according to claim 1,
    wherein color purity of the color pixel in the angle range equal to or greater than 30° and equal to or less than 330° is higher than color purity of the color pixel outside the angle range.

6. The display device according to claim 1, wherein the at least one laser irradiation device is configured to produce plasma at the display position,
    wherein the control device is configured to control intensity of the laser beam irradiated from the at least one laser irradiation device so that a relationship between intensity of plasma light emitted from the plasma and intensity of the laser beam scattered by the plasma becomes a predetermined relationship to display the colored display pixel,
    wherein the control device controls the intensity of the laser beam so that a power density of the laser beam emitted from the laser irradiation device is in a range equal to or greater than 1.5 times a plasma formation threshold, and equal to or less than 4 times the plasma formation threshold, and
    wherein the power density is obtained at the display position.

7. The display device according to claim 6, further comprising a measuring instrument configured to measure the power density of the laser beam emitted from the laser irradiation device,
    wherein the control device controls the intensity of the laser beam, depending on the power density measured by the measuring instrument.

8. The display device according to claim 6, wherein the plasma formation threshold is set in accordance with at least one of a laser spot diameter, a pulse width, and a wavelength of the laser beam emitted from the laser irradiation device.

9. The display device according to claim 1, wherein the at least one laser irradiation device is a plurality of laser irradiation devices, and
    wherein the plurality of laser irradiation devices emit laser beams having wavelengths different from each other.

10. A display method comprising a display step in which at least one laser irradiation device irradiates an irradiation point located at a display position in air, with a laser beam having a wavelength equal to or longer than 380 nm and equal to or shorter than 780 nm and produces a light emitter that emits light to an angle range equal to or greater than 30° and equal to or less than 330°, the angle range being defined with respect to an irradiation direction of the laser beam from the at least one laser irradiation device,
    wherein the display step comprises a control step in which intensity of the laser beam emitted from the at least one laser irradiation device is controlled so that the light emitter forms a colored display pixel at the display position.

11. The display method according to claim 10, wherein the at least one laser irradiation device is configured to produce plasma at the display position,
    wherein the intensity of the laser beam emitted from the at least one laser irradiation device is controlled in the control step so that a ratio of a Y value of the plasma light emitted from the plasma at the display position to a Y value of the scattered light produced from the laser beam and containing no plasma light is in a range equal to or greater than 1% and equal to or less than 95%, wherein the Y value of the plasma light is obtained by converting the intensity of the plasma light at the display position to XYZ tristimulus values in CIE 1931 in a wavelength range equal to or longer than 380 nm and equal to or shorter than 780 nm, and wherein the Y value of the scattered light is obtained by converting the intensity of the scattered light at the display position to XYZ tristimulus values in CIE 1931 in the wavelength range equal to or longer than 380 nm and equal to or shorter than 780 nm.

12. The display method according to claim 10, wherein the at least one laser irradiation device is configured to produce plasma at the display position, wherein the control device is configured to control intensity of the laser beam irradiated from the at least one laser irradiation device so that a relationship between intensity of plasma light emitted from the plasma and intensity of the laser beam scattered by the plasma becomes a predetermined relationship to display the colored display pixel, wherein the intensity of the laser beam is controlled in the control step so that a power density of the laser beam emitted from the at least one laser irradiation device is in a range equal to or greater than 1.5 times a plasma formation threshold, and equal to or less than 4 times the plasma formation threshold, and wherein the power density is obtained at the display position.

13. The display method according to claim 10, wherein the at least one laser irradiation device is a plurality of laser irradiation devices, and wherein the plurality of laser irradiation devices emit laser beams having wavelengths different from each other.

14. The display method according to claim 10, wherein the display position is controlled in the display step.

15. A non-transitory storage medium that stores a program that causes a computer to execute the display step of the display method according to claim 10.

16. A display method comprising a display step in which at least one laser irradiation device irradiates an irradiation point located at a display position in air with a laser beam having a wavelength equal to or longer than 380 nm and equal to or shorter than 780 nm, and produces a scatterer that scatters light to an angle range equal to or greater than 30° and equal to or less than 330°, the angle range being defined with respect to an irradiation direction of the laser beam from the at least one laser irradiation device, wherein the display step comprises a control step in which intensity of the laser beam emitted from the at least one laser irradiation device is controlled so that the light emitter forms a colored display pixel at the display position.

17. The display method according to claim 16, wherein the at least one laser irradiation device is configured to produce plasma at the display position, wherein the intensity of the laser beam emitted from the at least one laser irradiation device is controlled in the control step so that a ratio of a Y value of a plasma light emitted from the plasma at the display position to a Y value of the scattered light produced from the laser beam and containing no plasma light is in a range equal to or greater than 1% and equal to or less than 95%, wherein the Y value of the plasma light is obtained by converting the intensity of the plasma light at the display position to XYZ tristimulus values in CIE 1931 in a wavelength range equal to or longer than 380 nm and equal to or shorter than 780 nm, and wherein the Y value of the scattered light is obtained by converting the intensity of the scattered light at the display position to XYZ tristimulus values in CIE 1931 in the wavelength range equal to or longer than 380 nm and equal to or shorter than 780 nm.

18. The display method according to claim 16, wherein the at least one laser irradiation device is configured to produce plasma at the display position, wherein the control device is configured to control intensity of the laser beam irradiated from the at least one laser irradiation device so that a relationship between intensity of plasma light emitted from the plasma and intensity of the laser beam scattered by the plasma becomes a predetermined relationship to display the colored display pixel, wherein the intensity of the laser beam is controlled in the control step so that a power density of the laser beam emitted from the at least one laser irradiation device is in a range equal to or greater than 1.5 times a plasma formation threshold, and equal to or less than 4 times the plasma formation threshold, and wherein the power density is obtained at the display position.

19. The display method according to claim 16, wherein the at least one laser irradiation device is a plurality of laser irradiation devices, and wherein the plurality of laser irradiation devices emit laser beams having wavelengths different from each other.

20. The display method according to claim 16, wherein the display position is controlled in the display step.

* * * * *